United States Patent
Kato

(10) Patent No.: US 8,159,706 B2
(45) Date of Patent: Apr. 17, 2012

(54) INFORMATION PROCESSING SYSTEM, INFORMATION PROCESSING APPARATUS, AND INFORMATION COMMUNICATION METHOD

(75) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 640 days.

(21) Appl. No.: 12/203,370

(22) Filed: Sep. 3, 2008

(65) Prior Publication Data

US 2009/0066998 A1    Mar. 12, 2009

(30) Foreign Application Priority Data

Sep. 12, 2007  (JP) ................ 2007-237297
Nov. 21, 2007  (JP) ................ 2007-302173
Jun. 10, 2008  (JP) ................ 2008-152118

(51) Int. Cl.
 *G06F 3/12*  (2006.01)
 *H04B 7/00*  (2006.01)

(52) U.S. Cl. ...................... 358/1.15; 455/41.3

(58) Field of Classification Search ................ 358/1.15; 455/41.3

See application file for complete search history.

(56) References Cited

U.S. PATENT DOCUMENTS

2009/0103124 A1*  4/2009  Kimura et al. ............... 358/1.15

FOREIGN PATENT DOCUMENTS

JP    2006-163791    6/2006

OTHER PUBLICATIONS

Japanese Patent Application No. 2007-237297, Filed Sep. 12, 2007 (and English translation of abstract thereof).
Japanese Patent Application No. 2007-302173, Filed Nov. 21, 2007 (and English translation of abstract thereof).

* cited by examiner

*Primary Examiner* — Charlotte M Baker
*Assistant Examiner* — Justin Katzwhite
(74) *Attorney, Agent, or Firm* — Cooper & Dunham LLP

(57) ABSTRACT

When an information processing apparatus is present in a communication area of a first communicating unit, the first communicating unit transmits communication setting information and setting information indicating a process on substance information to the information processing apparatus. A second communicating unit establishes a communication with the information processing apparatus based on the communication setting information, and transmits the substance information to the information processing apparatus. A determining unit determines which of a communication by the first communicating unit or a communication by the second communicating unit is possible.

16 Claims, 18 Drawing Sheets

INFORMATION PROCESSING SYSTEM, INFORMATION PROCESSING APPARATUS, AND INFORMATION COMMUNICATION METHOD

CROSS-REFERENCE TO RELATED APPLICATIONS

The present application claims priority to and incorporates by reference the entire contents of Japanese priority document 2007-237297 filed in Japan on Sep. 12, 2007, Japanese priority document 2007-302173 filed in Japan on Nov. 21, 2007, and Japanese priority document 2008-152118 filed in Japan on Jun. 10, 2008.

BACKGROUND

1. Technical Field

This disclosure relates to an information processing system, an information processing apparatus, and an information communication method.

2. Description of the Related Art

In recent years, with the widespread of wireless communication technologies, the stage is becoming set that allows freedom of connection among information devices irrespective of time and place. In such connections among information devices through wireless communication technologies, the use range is less restricted than that in connections through wired communication technologies. Therefore, for users, operations using information devices through wireless communication technologies are advantageously easy (for example, document printing by remote control). On the other hand, however, for wireless communication, settings for connection among wireless devices often require more complex operations compared with communication through wired communication technologies. For example, when a user is in a working environment, such as an office, the user can reduce a user's own setting operation by asking a person skilled in communication technologies, such as a system administrator, for communication settings. However, a mobile worker working out on the road, for example, has to set a connection by oneself, and this setting operation is a considerable burden.

To get around this problem, in a technology disclosed in Japanese Patent Application Laid-open No. 2006-163791, a portable communication terminal transmits instruction information to an information processing apparatus by using a short-distance communication function and, with this instruction information, the information processing apparatus performs settings allowing a long-distance communication function and obtain a large capacity of data from the portable communication terminal. According to the technology disclosed in Japanese Patent Application Laid-open No. 2006-163791, a user uses the portable terminal device to set a multifunction peripheral (MFP) desired to be connected for communication and only coming near to the MFP is enough for establishing short-distance communication, thereby allowing the user to perform an easy connection for communication.

In the technology disclosed in Japanese Patent Application Laid-open No. 2006-163791, however, even a short-distance communication with the MFP is established, once the user moves to the outside of the area for that short-distance communication, the user can no longer perform a short-distance communication with the MFP with which the short-distance communication has been established, and therefore has to again come near to that MFP and transmit instruction information. This disadvantageously restricts a user's moving range. Moreover, the user cannot transmit instruction information unless the user brings the portable communication terminal in the range of short-distance communication with the MFP. Therefore, for example, when a user outside of the range of short-distance communication desires to print document data based on instruction information, the user has to once come near to a relevant MFP, requiring a long time until completion of printing and degrading work efficiency.

Furthermore, the MFP has a "trial printing" function, in which, when a user desires to print document data to produce a plurality of prints, only one print is produced first to allow the user to check the print state of that document. Even when the user checks the print state and then desires the remaining prints, such a print instruction cannot be transmitted through long-distance communication. Still further, even when the user is near an MFP and document data with a relatively small capacity, such as a small number of pages, is printed from that MFP, it is required to first switch the communication method from already-established short-distance communication to long-distance communication and then print the document data. This puts a considerable operation burden on the user.

BRIEF SUMMARY

According to an aspect of this disclosure, there is provided an information processing system including a portable terminal device including a first communicating unit and a second communicating unit that have different communication ranges and an information processing apparatus including a third communicating unit with a communication method same as a communication method of the first communicating unit and a fourth communicating unit with a communication method same as a communication method of the second communicating unit. The portable terminal device and the information processing apparatus communicates with each other using the first communicating unit and the third communicating unit through a non-contact communication, and using the second communicating unit and the fourth communicating unit through a non-contact communication. When the portable terminal device is present in a communication area of the information processing apparatus, the first communicating unit transmits communication setting information and setting information indicating a process on substance information containing a document or an image to be received or transmitted by the second communicating unit to the information processing apparatus through the non-contact communication, to establish a communication between the second communicating unit and the fourth communicating unit. The second communicating unit establishes a communication with the information processing apparatus, and transmits to or receives from the information processing apparatus the substance information through the non-contact communication. The portable terminal device further includes an input receiving unit that receives an input of a transmission instruction of transmitting the setting information and a determining unit that determines, for a communication with the information processing apparatus, which of a communication by the first communicating unit or a communication by the second communicating unit is possible. When the determining unit determines that a communication by the first communicating unit is not possible, the second communicating unit transmits the setting information based on the input transmission instruction. When the portable terminal device is present in the communication area of the information processing apparatus, the third communicating unit receives the communication setting information and the setting information from the portable terminal device through the non-contact communication. On the other hand, when the portable terminal device is not present in the communication area of the information processing apparatus, the fourth communicating unit receives from or transmits to the portable terminal device the communication setting information and the setting information through the non-contact communication. The information processing apparatus further includes a processing unit that processes the substance information with a setting according to the setting information received by either one of the third communicating unit and the fourth communicating unit.

According to another aspect of this disclosure, there is provided an information processing apparatus that communicates with a portable terminal device through a non-contact communication. The information processing apparatus includes a first communicating unit and a second communicating unit having different communication ranges. When the portable terminal device is present in a communication area of the information processing apparatus, the first communicating unit receives from or transmits to the portable terminal device communication setting information and setting information indicating a process on substance information containing a document or an image to be received or transmitted by the second communicating unit through the non-contact communication, to establish a communication with the second communicating unit. The second communicating unit establishes the communication with the portable terminal device based on the communication setting information received by the first communicating unit, and transmits to or receives from the portable terminal device the substance information through the non-contact communication. The information processing apparatus further comprises a processing unit that processes the substance information with a setting according to the setting information received by the first communicating unit.

According to still another aspect of this disclosure, there is provided an information communication method for an information processing apparatus that communicates with a portable terminal device through a non-contact communication, which includes a first communicating unit and a second communicating unit having different communication ranges. The information communication method includes first communicating including, when the portable terminal device is present in a communication area of the information processing apparatus, the first communicating unit receiving from or transmitting to the portable terminal device communication setting information and setting information indicating a process on substance information containing a document or an image to be received or transmitted by the second communicating unit through the non-contact communication, to establish a communication with the second communicating unit; second communicating including the second communicating unit establishing the communication with the portable terminal device based on the communication setting information received by the first communicating unit, and transmitting to or receiving from the portable terminal device the substance information through the non-contact communication; and processing including a processing unit processing the substance information with a setting according to the setting information received by the first communicating unit.

The aforementioned and other aspects, features, advantages and technical and industrial significance will be better understood by reading the following detailed description, when considered in connection with the accompanying drawings.

DETAILED DESCRIPTION OF THE PREFERRED EMBODIMENTS

Exemplary embodiments of the present invention will be explained in detail below with reference to the accompanying drawings. Note that the present invention is not restricted to these embodiments.

A first embodiment of the present invention is explained with reference to the attached drawings. The present embodiment is applied to, as one example of an information processing apparatus, a so-called multifunction peripheral (MFP) with a copy function, a facsimile (FAX) function, a print function, a scanner function, a function of distributing input image data (such as image data read by the scanner function, image data formed by the print function, and image data received by the FAX function), and other functions. Note that although description will be made below with the present embodiment being applied to the MFP as one example of the information processing apparatus, the present embodiment can be applied to any information processing apparatus, such as a print apparatus only with a print function and a scanner apparatus only with a scanner function, as well as an image forming apparatus with these functions, and is not restricted to the MFP.

Figure 1:
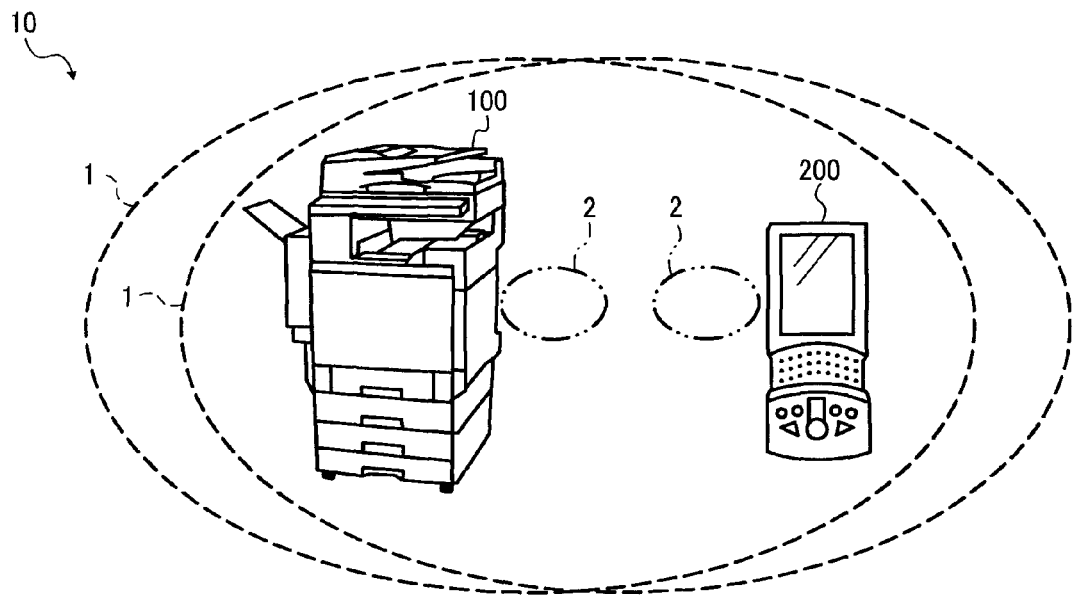
FIG. 1 is an image diagram of the configuration of an information processing system according to a first embodiment.

First, an example of configuration of an information processing system including the MFP and the portable terminal device to which the present invention is applied is explained. FIG. 1 is an image diagram of the configuration of an information processing system 10 according to the first embodiment. The information processing system 10 includes an MFP 100 and a portable terminal device 200, with the MFP 100 and the portable terminal device 200 capable of communication by two communicating units as explained below within communication areas 1 each surrounded by a broken line and communication areas 2 each surrounded by a two-dot-chain line.

Figure 2:
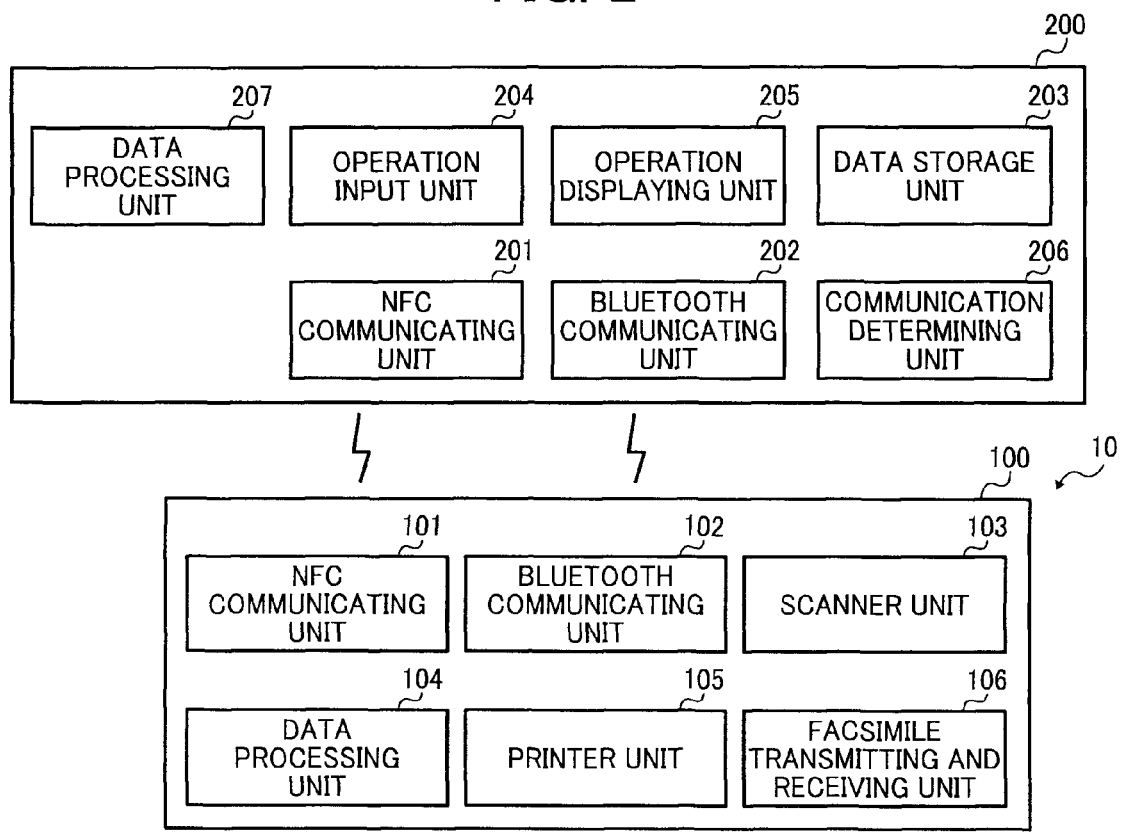
FIG. 2 is a block diagram of the configuration of an information processing system according to the first embodiment.

FIG. 2 is a block diagram of the configuration of the information processing system 10. The MFP 100 includes an NFC communicating unit 101, a Bluetooth (Registered Trademark) communicating unit 102, a scanner unit 103, a data processing unit 104, a printer unit 105, a FAX transmitting/receiving unit 106.

The NFC communicating unit 101 performs non-contact bi-directional communication with the portable terminal device 200 based on wireless communication standards called near-field communication (NFC) including a non-contact integrated circuit (IC), for example, and, more specifically, has either or both of a reader and writer function and a tag function having incorporated therein a communication control program for reading information from an NFC communicating unit 201 of the portable terminal device, which will be explained further below, in a non-contact manner. The NFC communicating unit 101 transmits and receives data through non-contact wireless communication with a shorter distance compared with that of the Bluetooth communicating unit 102, which is another communicating unit, that is, with a communication distance of 0 to ten-odd centimeters. Also, in non-contact communication of NFC standards by the NFC communicating unit 101, a data transfer rate (100 Kb/sec to 400 Kb/sec) is slower than the data transfer rate of wireless communication of Bluetooth by the Bluetooth communicating unit 102 (1 Mb/sec to 10 Mb/sec), and therefore the NFC communicating unit 101 is used for communication of data of relatively small capacity. Here, the communication standards of the NFC communicating unit 101 are not restricted to NFC, but can be other communication standards, such as infrared data association (IrDA), as long as the standards allow wireless communication within a relatively short distance, that is, wireless communication within a communication area smaller than the communication area of wireless communication of Bluetooth standards, which will be explained further below. The NFC communicating unit 101 forms a first communicating unit according to the present invention.

Figure 3:
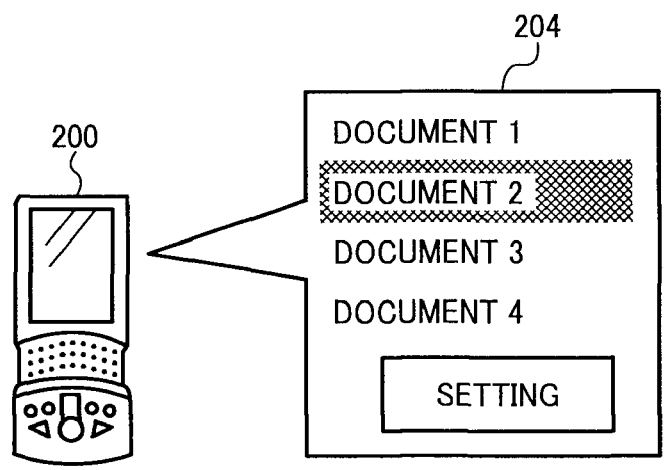
FIG. 3 is a drawing that explains one example of a display screen for specifying a document at an operation input unit.
Figure 4:
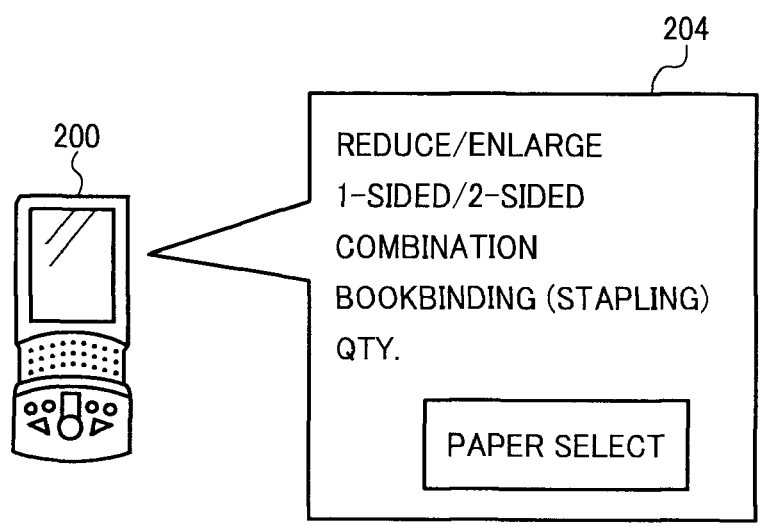
FIG. 4 is a drawing that explains one example of a display screen for specifying setting information at the operation input unit.

When the portable terminal device 200 is present in the communication area of the NFC communicating unit 101, the NFC communicating unit 101 establishes a communication with the NFC communicating unit 201 of the portable terminal device 200 with the same communication protocol as that of the communication control program of the NFC communicating unit 201 of the portable terminal device 200, receiving communication setting information and print setting information transmitted from the portable terminal device 200. Here, the communication setting information is initialization information required for wireless communication at the Bluetooth communicating unit 102, whilst the print setting information is information set at the portable terminal device 200, including the name of a document to be printed as depicted in FIG. 3 and print setting information for printing the document from the MFP 100 as depicted in FIG. 4 (for example, setting information about scaling, duplex printing, combine, whether to staple, and the number of prints). As such, with the communication setting information and the print setting information for Bluetooth communication being received by the MFP 100 from the portable terminal device 200 through NFC communication allowing easy data transmission and reception, the user can specify the MFP 100 as a communication counterpart for Bluetooth communication only by bringing the portable terminal device 200 close to the MFP 100 without performing any special operation, thereby increasing usability.

The Bluetooth communicating unit 102 communicates with the portable terminal device 200 in a non-contact manner with the Bluetooth standards. The Bluetooth communicating unit 102 adopting the wireless communication scheme of the Bluetooth standards transmits and receives a larger amount of data at higher speeds (1 Mb/sec to 10 Mb/sec), compared with the NFC communicating unit 101 in the non-contact communication scheme of the NFC standards. Also, the Bluetooth communicating unit 102 adopting the wireless communication scheme of the Bluetooth standards can be used as long as the distance between devices is within 10 meters even if an obstacle is present, and the communication area is larger than that of the communication scheme of the NFC standards.

The Bluetooth communicating unit 102 specifically includes a Bluetooth interface (I/F) for data transmission and reception, such as a transceiver of the Bluetooth standards, and a communication control unit. The Bluetooth I/F performs data transmission and reception with the portable terminal device 200 as a connection destination. The communication control unit is a communication control program that exchanges communication setting information via the Bluetooth I/F before receiving data from the portable terminal device 200 to establish wireless communication according to the Bluetooth standards. As the communication setting information, address information uniquely assigned to the Bluetooth I/F is used.

Here, in the present embodiment, the Bluetooth communicating unit 102 is used that conforms to the Bluetooth standards for wireless communication. This is not meant to be restrictive. In place of the Bluetooth standards, other so-called wireless local area network (LAN) standards, such as IEEE 802.11a/b/n/g standards, can be used for wireless communication. In this case, a wireless LAN communicating unit can be formed of a network board of IEEE 802.11a/b standards and a communication control unit (communication control program) that establishes wireless communication and controls data transmission and reception based on IEEE 802.11a/b standards. Also, when an ultra-wideband (UWB) communication scheme is used and the distance between devices is within 3 meters, wireless communication is possible according to wireless universal serial bus (USB) standards allowing communication of 480 Megabits per second, which is equivalent to USB 2.0 for wired communication. In this case, UWB standards can be used as wireless USB standards for data transmission and reception, and a UWB device and a communication control unit (communication control program) that establishes wireless communication and control data transmission and reception can be used to form a wireless USB communicating unit.

Also, when communication setting information is received from the portable terminal device 200 through NFC communication and a Bluetooth communication with the portable terminal device 200 is established based on the received communication setting information, the Bluetooth communicating unit 102 transmits and receives data specified in advance by the user using the portable terminal device 200. Here, the data to be transmitted and received can be any data, such as image data, document data, text data, and other various types of data (that is, substance data).

The scanner unit 103 reads an original by an imaging element, such as a charge-coupled device (CCD). Here, an automatic document feeder (ADF) may be incorporated in the scanner unit 103 to provide a mechanism for automatic original feeding.

The data processing unit 104 performs processes on the data received by the Bluetooth communicating unit 102 or the data to be transmitted by the Bluetooth communicating unit 102, for example, according to the print setting information received by the NFC communicating unit 101. For example, when the original data is portable document format (PDF) data and the print setting information as depicted in FIG. 4 is such that "100%" is set in "scaling", "duplex" is set in "duplex/one-side", "no combine" is set in "combine", "no stapling" is set in "bookbinding (stapling)", and "one" is set in "the number of prints", format data is generated by converting these pieces of setting information to printer job language (PJL) data supporting a PDF data format. Also, when document data, such as PDF data, is received from the portable terminal device 200, the generated format data is read as header information or footer information of the PDF data, for example, and layout processing is performed, such as the scaling and the duplex printing. Also, for the data read by the scanner unit 103, image processing, layout processing, and others are performed according to scanner setting information received from the portable terminal device 200.

The printer unit 105 prints data subjected to image processing or layout processing, for example, by the data processing unit 104.

The FAX transmitting/receiving unit 106 transmits the data read by the scanner unit 103 and data transmitted from the portable terminal device 200 to another MFP, FAX device, or client terminal via a network.

Next, the portable terminal device 200 is explained. The portable terminal device 200 includes the NFC communicating unit 201, a Bluetooth communicating unit 202, a data storage unit 203, an operation input unit 204, an operation displaying unit 205, a communication determining unit 206, and a data processing unit 207. Specifically, the portable terminal device 200 is a portable telephone, a personal digital assistant (PDA), a notebook personal computer, or a portable storage medium, for example.

When the portable terminal device 200 is present within a communication bloc of the NFC communicating unit 101 of the MFP 100, the NFC communicating unit 201 establishes a communication with the NFC communicating unit 101 of the MFP 100 with the same communication protocol as that of the communication control program of the NFC communicating unit 101 of the MFP 100. The NFC communicating unit 201 also transmits communication setting information for establishing a communication by the Bluetooth communicating unit 202 and print setting information for printing documents and others from the MFP 100.

Specifically, the NFC communicating unit 201 is an NFC chip having incorporated therein a tag and a communication control program that establishes communication and controls data transmission and reception. In this tag, the communication setting information is stored. When the NFC communicating unit 201 comes near to the MFP 100 and is present within the communication area of the MFP 100, a communication is established, and the information in the tag is read by the NFC communicating unit (reader and writer) 101 of the MFP 100 for transmission.

Here, in this case, an NFC chip having incorporated therein a tag and a communication control program may be stored in a non-contact IC card and the communication setting information may be transmitted to the MFP 100 independently of the main body of the portable terminal device 200.

Here, in the present embodiment, a tag having the communication setting information stored therein is provided to the NFC communicating unit 201 of the portable terminal device 200, and the NFC communicating unit 101 of the MFP 100 is configured as a reader and writer. This is not meant to be restrictive, however. The NFC communicating unit 201 of the portable terminal device 200 may be taken as a reader and writer, and the NFC communicating unit 101 of the MFP 100 may be taken as a tag. In this case, the communication setting information is stored in the NFC communicating unit 101 of the MFP 100, and the NFC communicating unit 201 of the portable terminal device 200 is brought near to the NFC communicating unit 101 to establish a communication. A control unit not depicted in any drawing transfers the communication setting information of the NFC communicating unit 101 to the NFC communicating unit 201. With the reader and writer of the NFC communicating unit 201, the transferred communication setting information is processed at a control unit of the portable terminal device 200.

Also, the NFC communicating unit 201 of the portable terminal device 200 and the NFC communicating unit 101 of the MFP 100 may both be provided with a tag function and a reader and writer function.

The Bluetooth communicating unit 202 establishes a communication with the Bluetooth communicating unit 102 of the MFP 100 with the same communication protocol as that of the communication control program of the Bluetooth communicating unit 102 of the MFP 100. Upon establishment of a communication, the Bluetooth communicating unit 202 transmits the data stored in the data storage unit 203 to the MFP 100. Also, the Bluetooth communicating unit 202 receives data processed by using the functions of the MFP 100.

The data storage unit 203 stores data for using the functions of the MFP 100. For example, when the print function of the MFP 100 is used, the data storage unit 203 stores document data for printing (for example, document data as depicted in FIG. 3, such as "document 1" to "document 4"). When the scanner function of the MFP 100 is used, the data storage unit 203 stores document data scanned by the MFP 100 and received therefrom. Also, the data storage unit 203 has stored in advance, for example, print settings for using the print function of the MFP 100 to print document data and scan setting information for using the scanner. By operating the operation input unit 204, which will be explained below, the user can specify such setting information and cause document data to be printed from the MFP 100 according to the settings.

The operation input unit 204 includes operation buttons, such as push buttons, accepting inputs of an instruction for select document data from the user, the print setting information, and the scanner setting information. For example, as depicted in FIG. 3, the user selects document data stored in the data storage unit 203 by an operation of the button of the portable terminal device 200 or, as depicted in FIG. 4, the user specifies print setting information and scanner setting information through an operation of a relevant button. Also, the operation input unit 204 accepts an instruction input from the user as to whether to perform a communication by the NFC communicating unit 201 or a communication by the Bluetooth communicating unit 202. With this instruction input being accepted, when the communication determining unit 206, which will be explained further below, determines that a communication by the NFC communicating unit 201 is not possible, the Bluetooth communicating unit 202 will transmit the print setting information and others according to the instruction.

The operation displaying unit 205 includes a screen, such as a liquid-crystal display, displaying each name of the document data and its print setting information and scanner setting information stored in the data storage unit 203. For example, when the print setting information is specified, as depicted in FIG. 3 or FIG. 4, the operation displaying unit 205 displays, according to the operation of the operation input unit 204 by the user, the name of the document data "document 2" and various pieces of print setting information for that document data, such as "scaling", "duplex/one-side", "combine", "bookbinding (stapling)", and "the number of prints". Also, when the scan setting information is specified, the operation displaying unit 205 displays scan setting information, such as "original type", "resolution", and "read size". In addition, the operation displaying unit 205 displays a message indicative of the magnitude of radio field intensity, for example.

The communication determining unit 206 determines whether the communication between the portable terminal device 200 and the MFP 100 is kept after an NFC communication or a Bluetooth communication is established. This determination is made based on the use state of the portable terminal device 200, such as a communication distance between the portable terminal device 200 and the MFP 100 and the radio field intensity of the NFC communicating unit 201 and the Bluetooth communicating unit 202. Then, the communication determining unit 206 selects either one of a communication by the NFC communicating unit 201 and a communication by the Bluetooth communicating unit 202. Here, although the communication determining unit 206 selects either one of a communication by the NFC communicating unit 201 and a communication by the Bluetooth communicating unit 202 for communication with the MFP 100 based on the radio field intensity, this is not meant to be restrictive, and this determination may be made based on any factor as long as it defines a communication area between the MFP 100 and the portable terminal device 200.

The data processing unit 207 performs processing on the document to be transmitted by the Bluetooth communicating unit 202 according to the print setting information for use in transmission by the NFC communicating unit 201 or the scanner setting information. When the user determines that the processing capability of the MFP 100 seems to be low, the data processing unit 207 generates format data through an operation from the operation input unit 204 for processing to a print data format. For example, when the document data is PDF data and the print setting information as depicted in FIG. 4 is such that "100%" is set in "scaling", "duplex" is set in "duplex/one-side", "no combine" is set in "combine", "no stapling" is set in "bookbinding (stapling)", and "one" is set in "the number of prints", the data processing unit 207 generates format data by converting the print setting information to PJL data supporting a PDF data format, and combines the format data with the header information or the footer information of the PDF data.

Figure 5:
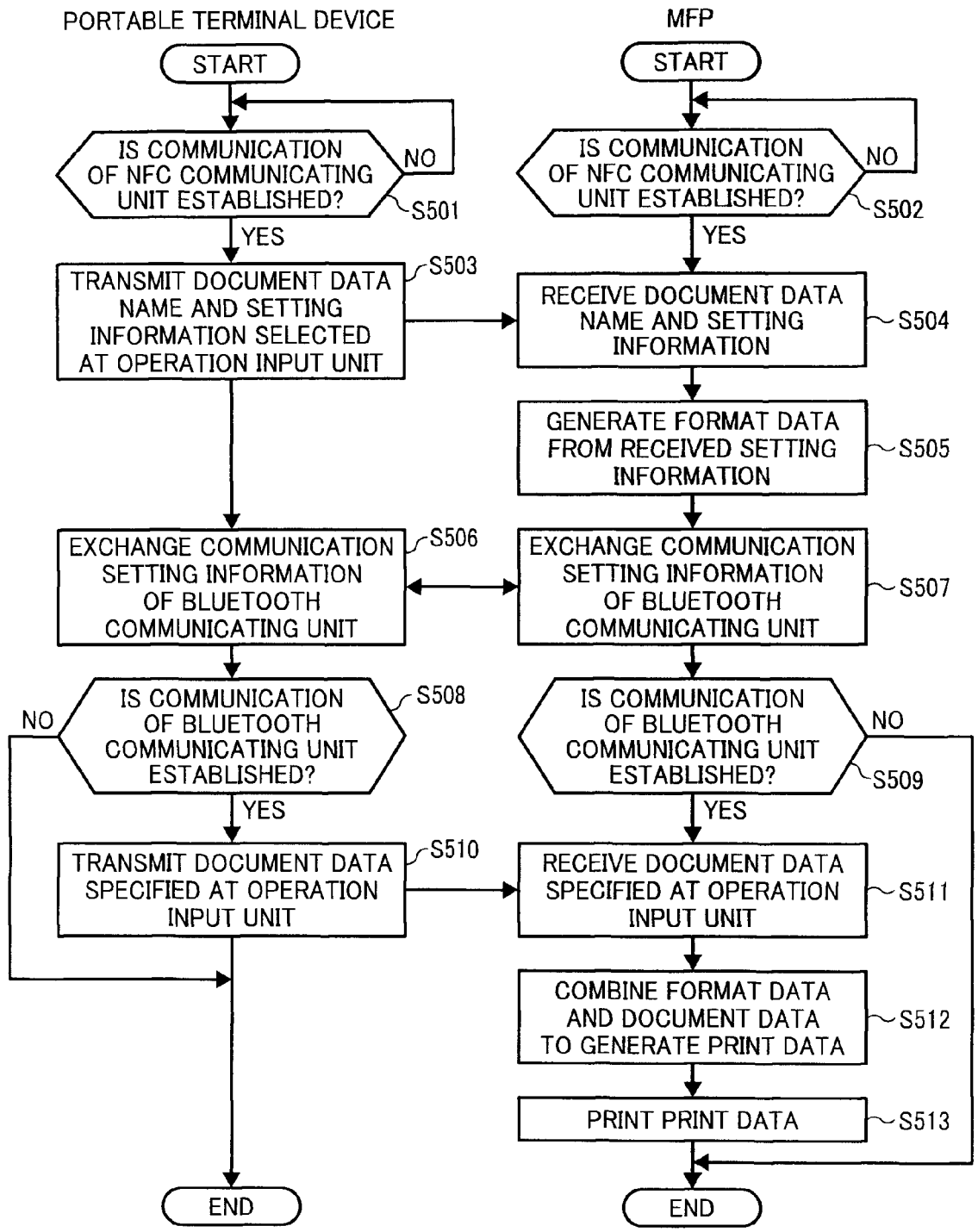
FIG. 5 is a flowchart of a wireless communication establishing procedure and a data processing procedure performed by the information processing system according to the first embodiment.

Next, a process of establishing a wireless communication and data processing by the information processing system 10 configured as explained above to include the MFP 100 and the portable terminal device 200 are explained. FIG. 5 is a flowchart of a wireless communication establishing procedure and a data processing procedure performed by the information processing system 10. Here, it is assumed in the following explanation that the user operates the operation input unit 204 of the portable terminal device 200 to select document data (for example, "document 2" depicted as hatched in FIG. 3) and further has already specified each piece of print setting information depicted in FIG. 4.

First, in the portable terminal device 200, the NFC communicating unit 201 determines whether a communication between the NFC communicating unit 201 of the portable terminal device 200 and the NFC communicating unit 101 of the MFP 100 is established (Step S501). When it is determined that a communication with the NFC communicating unit 101 of the MFP 100 is been established, that is, the portable terminal device 200 is not present within the communication bloc and the radio field intensity does not reach a predetermined value ("No" at Step S501), the procedure returns to Step S501, which is repeated until a communication with the NFC communicating unit 101 of the MFP 100 is possible.

Similarly, in the MFP 100, the NFC communicating unit 101 determines whether a communication with the NFC communicating unit 201 of the portable terminal device 200 is established (Step S502). When it is determined that a communication with the NFC communicating unit 201 of the portable terminal device 200 is not established, that is, the portable terminal device 200 is not present within the communication bloc and the radio field intensity does not reach a predetermined value ("No" at Step S502), the procedure returns to Step S502, which is repeated until a communication with the NFC communicating unit 201 of the portable terminal device 200 is established.

Next, upon establishment of the communication with the NFC communicating unit 201 of the portable terminal device 200, the NFC communicating unit 201 transmits to the NFC communicating unit 101 of the MFP 100 the document data name as depicted in FIG. 3 and the print setting information as depicted in FIG. 4 input by the user from the operation input unit 204 (Step S503). Here, the case where a communication by the portable terminal device 200 is established means that the user causes the NFC communicating unit 201 of the portable terminal device 200 and the NFC communicating unit 101 of the MFP 100 to be touched each other, thereby allowing the user to reliably specify the MFP 100 desired by the user for use.

Then, in the MFP 100, the NFC communicating unit 101 receives the document data name and print setting information transmitted from the NFC communicating unit 201 of the portable terminal device 200 (Step S504).

Then, the data processing unit 104 generates format data, such as PJL data, from the print setting information received from the portable terminal device 200 (Step S505).

Then, the NFC communicating unit 101 exchanges communication setting information with the portable terminal device 200 (Steps S506 and S507). Specifically, the NFC communicating unit 101 of the MFP 100 to the portable terminal device 200, transmission of the communication setting information is requested, and the NFC communicating unit 201 of the portable terminal device 200 transmits the communication setting information for Bluetooth communication. Here, the communication setting information for Bluetooth communication may be transmitted at Steps S507 and S508 together with the document data name and the print setting information.

In the portable terminal device 200, the NFC communicating unit 201 determines whether a communication between the Bluetooth communicating unit 202 of the portable terminal device 200 and the Bluetooth communicating unit 102 of the MFP 100 is established (Step S508). When it is determined that a communication with the Bluetooth communicating unit 102 of the MFP 100 is not established ("No" at Step S508), the procedure ends. When it is determined that a communication with the Bluetooth communicating unit 102 of the MFP 100 is established ("Yes" at Step S508), the Bluetooth communicating unit 202 transmits to the MFP 100 the document data stored in the data storage unit 203 and specified through the operation from the operation input unit 204 (Step S510).

Also, in the MFP 100, the Bluetooth communicating unit 102 determines whether a communication with the Bluetooth communicating unit 202 of the portable terminal device 200 is established (Step S509). When it is determined that a communication with the Bluetooth communicating unit 202 of the portable terminal device 200 is not established ("No" at Step S509), the procedure ends.

On the other hand, when it is determined that a communication with the Bluetooth communicating unit 202 of the portable terminal device 200 is established ("Yes" at Step S509), the Bluetooth communicating unit 102 receives the data transmitted from the portable terminal device 200 (Step S511). Here, the data to be received is data before processed according to the print setting information.

The data processing unit 104 combines the format data generated at Step S506 and the document data received at Step S511 to generate print data (Step S512). A printer unit 107 then prints the processed data (Step S513).

In this manner, when the MFP 100 is present within the communication area of the NFC communicating unit 201, the NFC communicating unit 201 transmits, to the information processing apparatus via the NFC communicating unit 201 through non-contact communication, the communication setting information for establishing a communication by the Bluetooth communicating unit 202 and the setting information indicative of settings for processing the substance information containing the document or image to be transmitted by the Bluetooth communicating unit 202. The Bluetooth communicating unit 202 then establishes a communication with the MFP 100 based on the communication setting information transmitted by the NFC communicating unit 201, and then transmits the substance information to the MFP 100 via the Bluetooth communicating unit 202 through non-contact communication. This can reduce the burden of a communication operation.

In the first embodiment, the print setting information is transmitted to the MFP 100 through communication between the NFC communicating unit 201 of the portable terminal device 200 and the NFC communicating unit 101 of the MFP 100, and then the document data is transmitted to the MFP 100 through communication between the Bluetooth communicating unit 202 and the Bluetooth communicating unit 102. In the data processing unit 104, the print setting information and the document data is combined together for printing. However, depending on the type of the MFP 100, the MFP may have a processing capability inferior to that of the portable terminal device 200. In the following, the case to address such a situation as mentioned above is explained in which the print data obtained by combining the print setting information and the document data together is generated at the portable terminal device 200 and is then transmitted to the MFP 100, which prints the received print data. The device configuration of an information processing system according to a second embodiment of the present invention is similar to that of the first embodiment, and therefore explanation of each structure by using a block diagram is omitted herein. A wireless communication establishing procedure and a data processing procedure are now explained by using a flowchart. In the following explanation, the same process as that in the first embodiment is provided with the same reference numeral and is not explained herein, and only different processes are explained herein.

Figure 6:
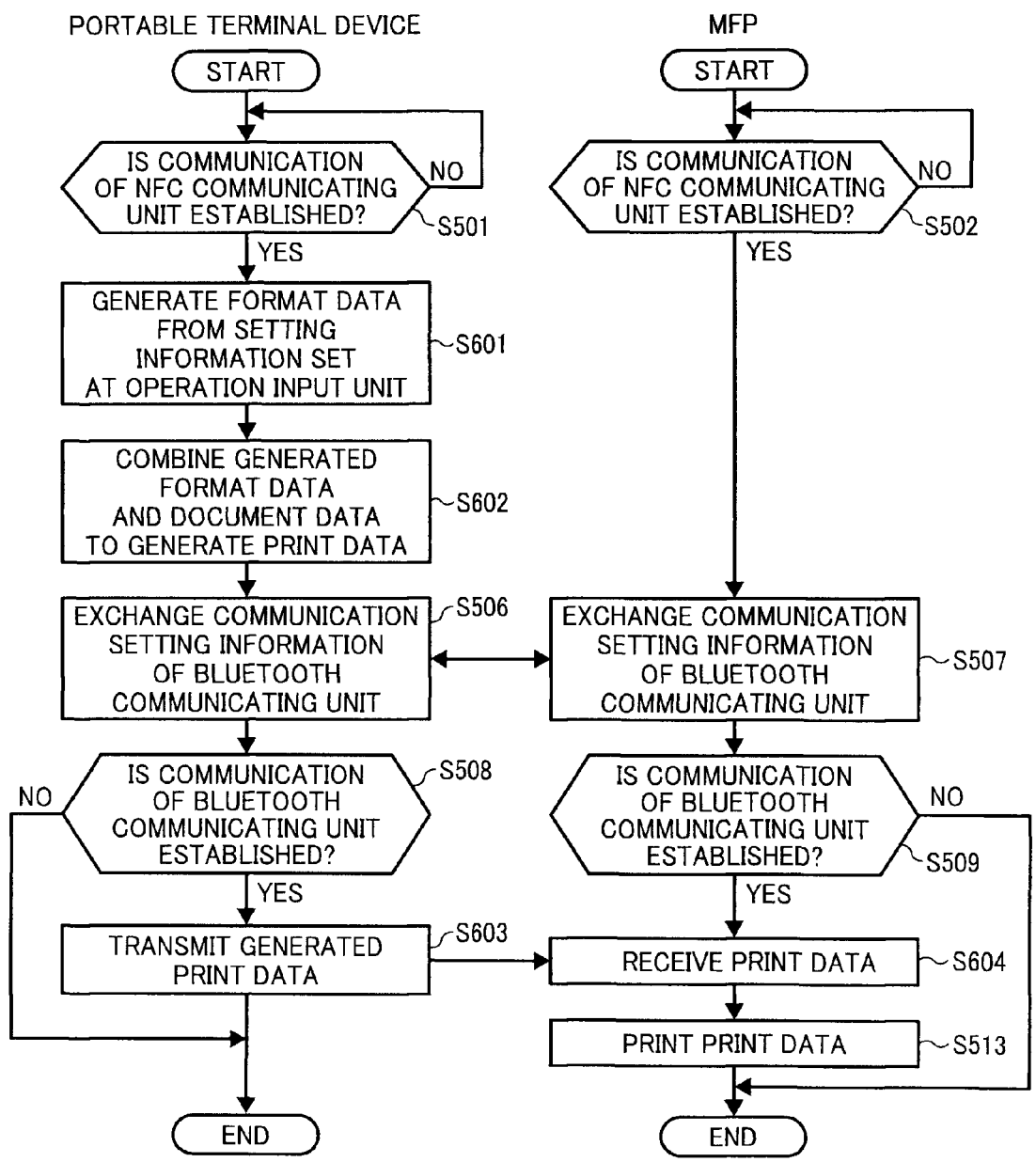
FIG. 6 is a flowchart of a wireless communication establishing procedure and a data processing procedure performed by an information processing system according to a second embodiment.

FIG. 6 is a flowchart of a wireless communication establishing procedure and a data processing procedure performed by an information processing system 10 according to the second embodiment.

Upon establishment of a communication between the NFC communicating unit 201 of the portable terminal device 200 and the NFC communicating unit 101 of the MFP 100 (Steps S501 and S502), the data processing unit 207 generates format data from the print setting information set at the operation input unit 204 (Step S601).

The data processing unit 207 then combines the format data generated at Step S601 and the document data specified from the operation input unit 204 by the user to generate print data (Step S602).

Then, an exchange of communication setting information is performed at each of the Bluetooth communicating units (Steps S506 and S507). Upon establishment of a communication between the Bluetooth communicating unit 202 and the Bluetooth communicating unit 102 (Steps S508 and S509), the Bluetooth communicating unit 202 transmits to the MFP 100 the print data generated at Step S602 (Step S603), whilst the Bluetooth communicating unit 102 of the MFP 100 receives the data transmitted from the portable terminal device 200 (Step S604). Here, the data received by the Bluetooth communicating unit 102 is print data after processed according to the print setting information at Step S602.

In this manner, even when the processing capability of the MFP 100 is low, when the MFP 100 is present within the communication area of the NFC communicating unit 201, the NFC communicating unit 201 transmits, to the information processing apparatus through non-contact communication, the communication setting information for establishing a communication by the Bluetooth communicating unit 202 and the setting information indicative of settings for processing the substance information containing the document or image to be transmitted by the Bluetooth communicating unit 202. The Bluetooth communicating unit 202 then establishes a communication with the MFP 100 based on the communication setting information transmitted by the NFC communicating unit 201, and then transmits the substance information to the MFP 100 through non-contact communication. This can reduce the burden of a communication operation.

In the first and second embodiments, the portable terminal device 200 is brought near to the MFP 100 to cause the NFC communicating unit 101 and the NFC communicating unit 201 to perform transmission and reception of the print setting information and other information. However, in some cases, the user may move away from the location of the MFP 100 and cannot perform communication by the NFC communicating unit. In the following, the case is explained in which, even when communication by the NFC communicating unit is impossible, communication by the Bluetooth communicating unit is performed for transmission and reception of the print setting information. The device configuration of an information processing system according to a third embodiment of the present invention is similar to that of the first and second embodiments, and therefore explanation of each structure by using a block diagram is omitted herein. A wireless communication establishing procedure and a data processing procedure are now explained by using a flowchart. In the following explanation, the same process as that in the first and second embodiments is provided with the same reference numeral and is not explained herein, and only different processes are explained herein.

Figure 7:
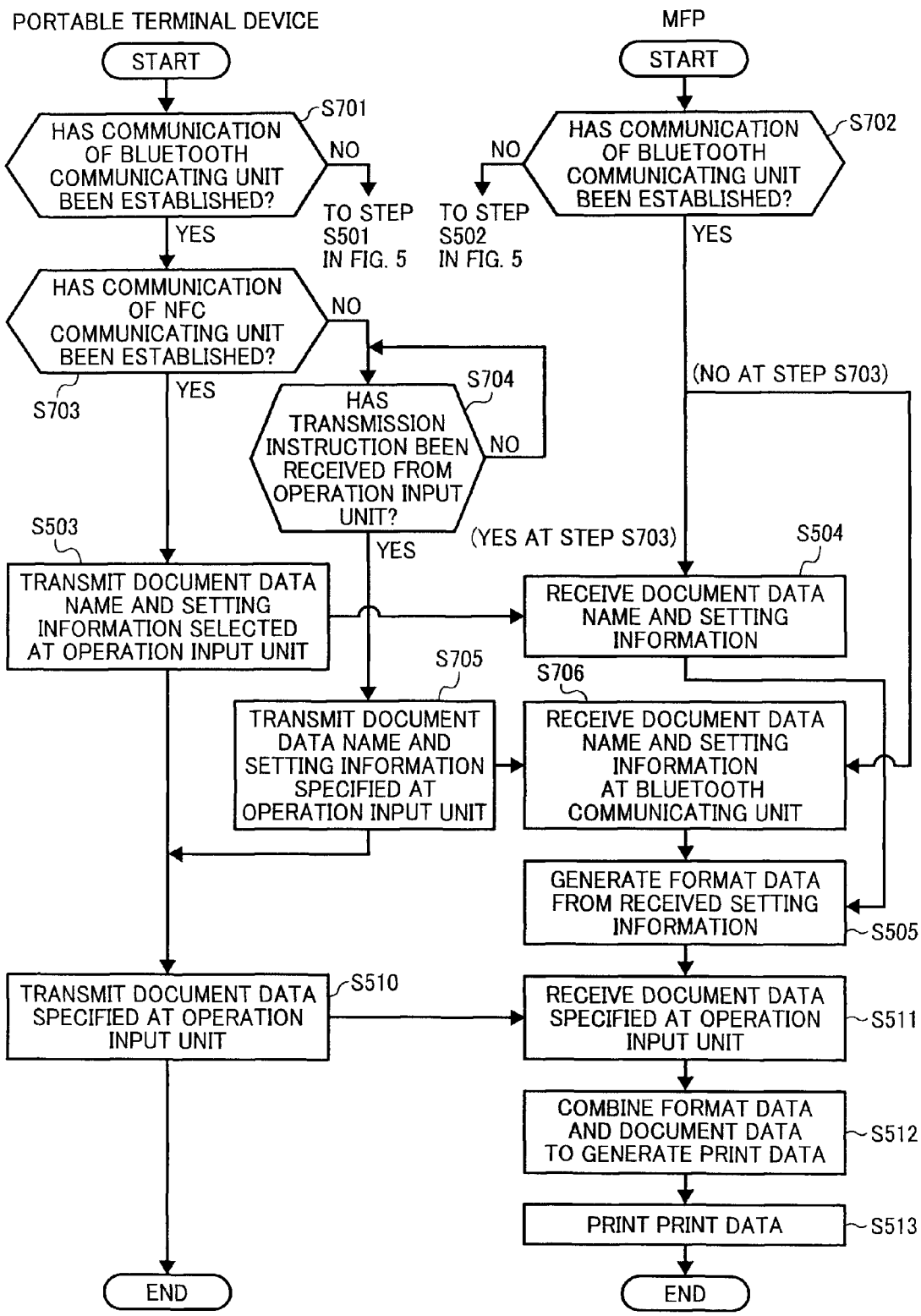
FIG. 7 is a flowchart of a wireless communication establishing procedure and a data processing procedure performed by an information processing system according to a third embodiment.

FIG. 7 is a flowchart of a wireless communication establishing procedure and a data processing procedure performed by an information processing system 10 according to the third embodiment.

First, in the portable terminal device 200, the Bluetooth communicating unit 202 determines whether a communication between the Bluetooth communicating unit 202 of the portable terminal device 200 and the Bluetooth communicating unit 102 of the MFP 100 has been established (Step S701). When it is determined that a communication with the Bluetooth communicating unit 102 of the MFP 100 is not established ("No" at Step S701), the procedure goes to Step S501 in the first embodiment to perform the processes in the first embodiment.

Also, in the MFP 100, the Bluetooth communicating unit 102 determines whether a communication with the Bluetooth communicating unit 202 of the portable terminal device 200 is established (Step S702). When it is determined that a communication with the Bluetooth communicating unit 202 of the portable terminal device 200 is not established ("No" at Step S702), the procedure goes to Step S502 in the first embodiment to perform the processes in the first embodiment.

Then, when the Bluetooth communicating unit 202 determines that a communication between the Bluetooth communicating unit 202 and the Bluetooth communicating unit 102 is established ("Yes" at Step S701), the communication determining unit 206 determines whether a communication by the NFC communicating unit is established (Step S703). When it is determined that a communication by the NFC communicating unit is not established ("No" at Step S703), the communication determining unit 206 determines whether the operation input unit 204 has received a transmission instruction from the user (Step S704). When determining that the operation input unit 204 has not received a transmission instruction ("No" at Step S704), the communication determining unit 206 waits until the operation input unit 204 receives a transmission instruction.

On the other hand, when the communication determining unit 206 determines that a transmission instruction has been received from the operation input unit 204 ("Yes" at Step S704), the Bluetooth communicating unit 202 transmits the document data name and the print setting information specified by the user from the operation input unit 204 to the Bluetooth communicating unit 102 of the MFP 100 (Step S705). Then, the Bluetooth communicating unit 102 of the MFP 100 receives the document data name and the print setting information specified at the operation input unit 204 of the portable terminal device 200 (Step S706). Here, processes after this Step S706 and onward performed at the MFP 100 are similar to those at Steps S505, S511, S512, and S513 in the first embodiment, and therefore are not explained herein.

Also, when it is determined that a communication by the NFC communicating unit is possible ("Yes" at Step S703), a process similar to the process at Step S504 in the first embodiment is performed. Then, processes after this Step S504 and onward are similar to those at Steps S505, S511, S512, and S513 in the first embodiment, and therefore are not explained herein.

In this manner, when the MFP 100 is present within the communication area of the NFC communicating unit 201, the NFC communicating unit 201 transmits, to the MFP 100 through non-contact communication, the communication setting information for establishing a communication by the establishing a communication of the Bluetooth communicating unit 202 and the setting information indicative of settings for processing the substance information containing the document or image to be transmitted by the Bluetooth communicating unit 202. The Bluetooth communicating unit 202 then establishes a communication with the MFP 100 based on the communication setting information transmitted by the NFC communicating unit 201, and then transmits the substance information to the MFP 100 through non-contact communication. The operation input unit 204 then accepts an input of a transmission instruction of the setting information. The communication determining unit 206 then determines which of a communication by he NFC communicating unit 201 or a communication by the Bluetooth communicating unit 202 is possible with the MFP 100. When the communication determining unit 206 determines that a communication by the NFC communicating unit 201 is not possible, the Bluetooth communicating unit 202 then transmits the setting information based on an input transmission instruction. This can allow selection of a communication method desirable for the user, thereby reduces the burden of a communication operation.

In the third embodiment, even when a communication by the NFC communicating unit is not possible, the print setting information is transmitted and received according to a communication by the Bluetooth communicating unit. However, depending on the type of the MFP 100, the MFP may have a processing capability inferior to that of the portable terminal device 200. In the following, the case is explained in which print data obtained by combining the print setting information and the document data is generated by the portable terminal device 200 and is transmitted through a communication by the NFC communicating unit or the Bluetooth communicating unit to the MFP 100, which receives the print data for printing. The device configuration of an information processing system according to a fourth embodiment of the present invention is similar to that of the first embodiment, and therefore explanation of each structure by using a block diagram is omitted herein. A wireless communication establishing procedure and a data processing procedure are now explained by using a flowchart. In the following explanation, the same process as that in the first embodiment is provided with the same reference numeral and is not explained herein, and only different processes are explained herein.

Figure 8:
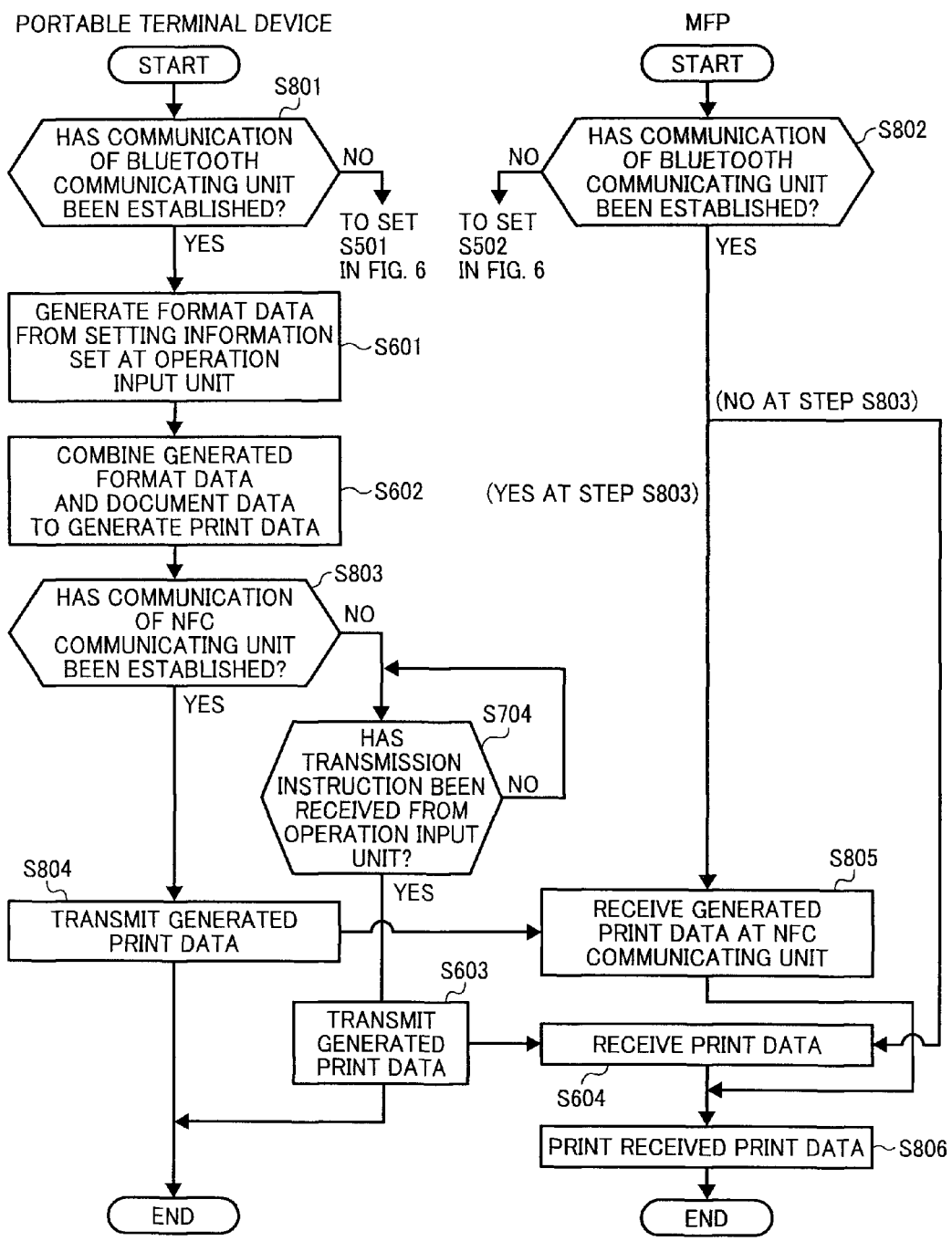
FIG. 8 is a flowchart of a wireless communication establishing procedure and a data processing procedure performed by an information processing system according to a fourth embodiment.

FIG. 8 is a flowchart of a wireless communication establishing procedure and a data processing procedure performed by an information processing system 10 according to the fourth embodiment.

First, in the portable terminal device 200, the Bluetooth communicating unit 202 determines whether a communication between the Bluetooth communicating unit 202 of the portable terminal device 200 and the Bluetooth communicating unit 102 of the MFP 100 has already been established (Step S801). When it is determined that a communication with the Bluetooth communicating unit 102 of the MFP 100 has not been established ("No" at Step S801), the procedure goes to Step S601 in the second embodiment to perform the processes in the second embodiment.

In the MFP 100, the Bluetooth communicating unit 102 determines whether a communication with the Bluetooth communicating unit 202 of the portable terminal device 200 has already been established (Step S802). If a communication with the Bluetooth communicating unit 202 of the portable terminal device 200 has not been established ("No" at Step S802), the procedure goes to Step S502 in the first embodiment to perform the processes in the second embodiment.

Then, after the data processing unit 207 combines the format data and the document data to generate print data (Steps S601 and S602), the communication determining unit 206 determines whether an NFC communication is possible (Step S803). When it is determined that a communication by the NFC communicating unit is possible ("Yes" at Step S803), the NFC communicating unit 201 transmits the generated print data to the NFC communicating unit 101 (Step S804).

On the other hand, when the communicating determining unit 206 determines that a communication by the NFC communicating unit is not possible ("No" at Step S803), as with the process at Step S704 in FIG. 7 and the process at Step S603 in FIG. 6, the Bluetooth communicating unit 202 transmits the generated print data to the Bluetooth communicating unit 102.

Then, in the MFP 100, the NFC communicating unit 101 or the Bluetooth communicating unit 102 receives the print data (Steps S805 and S806). The printer unit 107 then prints the print data received at Step S805 or Step S604 (Step S806).

In this manner, even when the processing capability of the MFP 100 is low, when the MFP 100 is present within the communication area of the NFC communicating unit 201, the NFC communicating unit 201 transmits, to the MFP 100 via the NFC communicating unit 201 through non-contact communication, the communication setting information for establishing a communication by the Bluetooth communicating unit 202 and the setting information indicative of settings for processing the substance information containing the document or image to be transmitted by the Bluetooth communicating unit 202. The Bluetooth communicating unit 202 then establishes a communication with the MFP 100 based on the communication setting information transmitted by the NFC communicating unit 201, and then transmits the substance information to the MFP 100 through non-contact communication. The operation input unit 204 then accepts an input of a transmission instruction of the setting information. The communication determining unit 206 then determines which of a communication by the NFC communicating unit 201 or a communication by the Bluetooth communicating unit 202 is possible with the MFP 100. When the communication determining unit 206 determines that a communication by the NFC communicating unit 201 is not possible, the Bluetooth communicating unit 202 then transmits the setting information based on an input transmission instruction. This can allow selection of a communication method desirable for the user, thereby reducing the burden of a communication operation.

In the first to fourth embodiment, depending on which of a communication by the NFC communicating unit or a communication by the Bluetooth communicating unit is possible, that is, depending on whether the portable terminal device 200 or the MFP 100 is present in the relevant communication area, the portable terminal device 200 and the MFP 100 determine a communication method of communicating the print setting information, the document data, and others. However, if the data capacity is smaller than a predetermined number of bytes or a predetermined number of pages, or the data is highly confidential, for example, irrespective of the communication area between the portable terminal device 200 and the MFP 100, transmission and reception of document data through communication by NFC communicating unit may be desirable in view of a rapid connection process for the former case of a small data capacity and in view of increased security for the latter case of confidentiality. In the following, the case is explained in which the portable terminal device 200 first determines an attribute of document data, such as the data size, the number of pages, or the degree of confidentiality, and then a communication by the NFC communicating unit or a communication by the Bluetooth communicating unit is performed.

Figure 9:
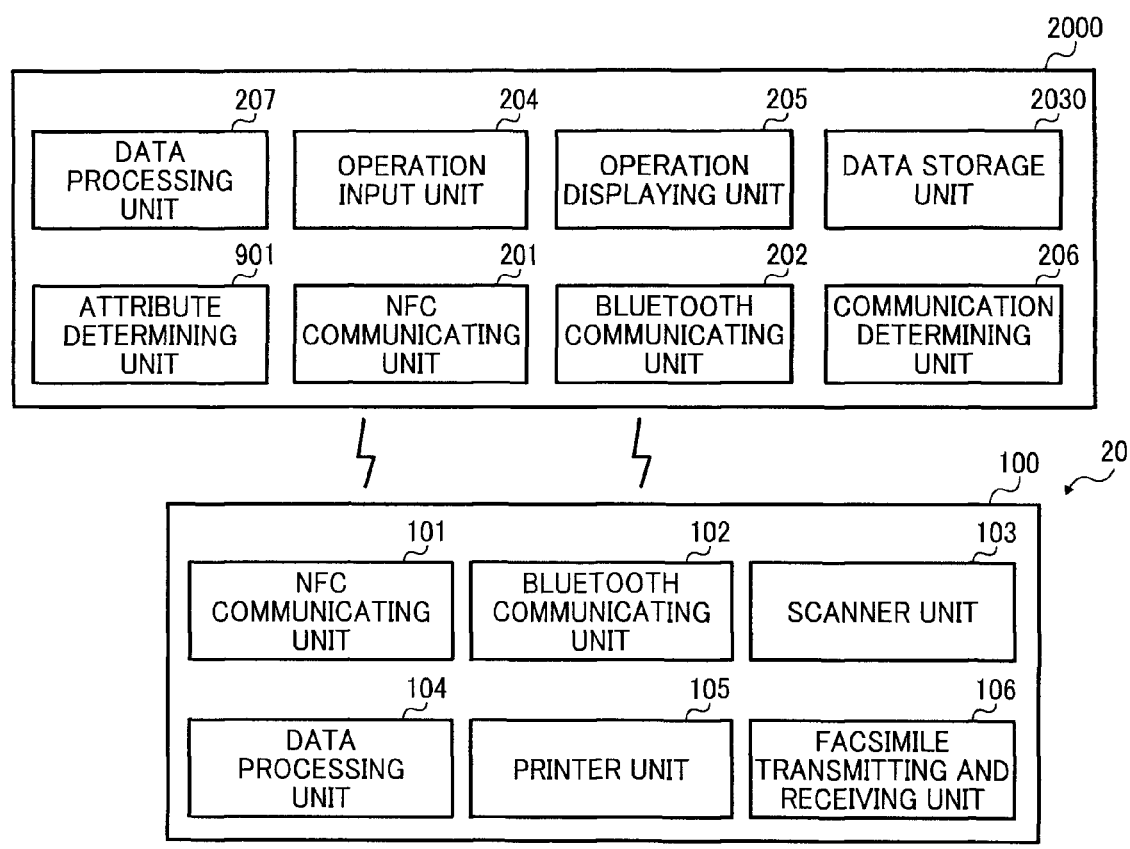
FIG. 9 is a block diagram of the configuration of an information processing system according to a fifth embodiment.

FIG. 9 is a block diagram of the configuration of an information processing system 20 according to the present embodiment. A portable terminal device 2000 according to the present embodiment is different from the portable terminal device 200 according to the first to fourth embodiments in that the portable terminal device 2000 includes an attribute determining unit 901 that determines an attribute of document data and a data storage unit 2030 different from the data storage unit 203. In the following explanation, the same component as that in the first embodiment is provided with the same reference numeral and is not explained herein.

Figure 10:
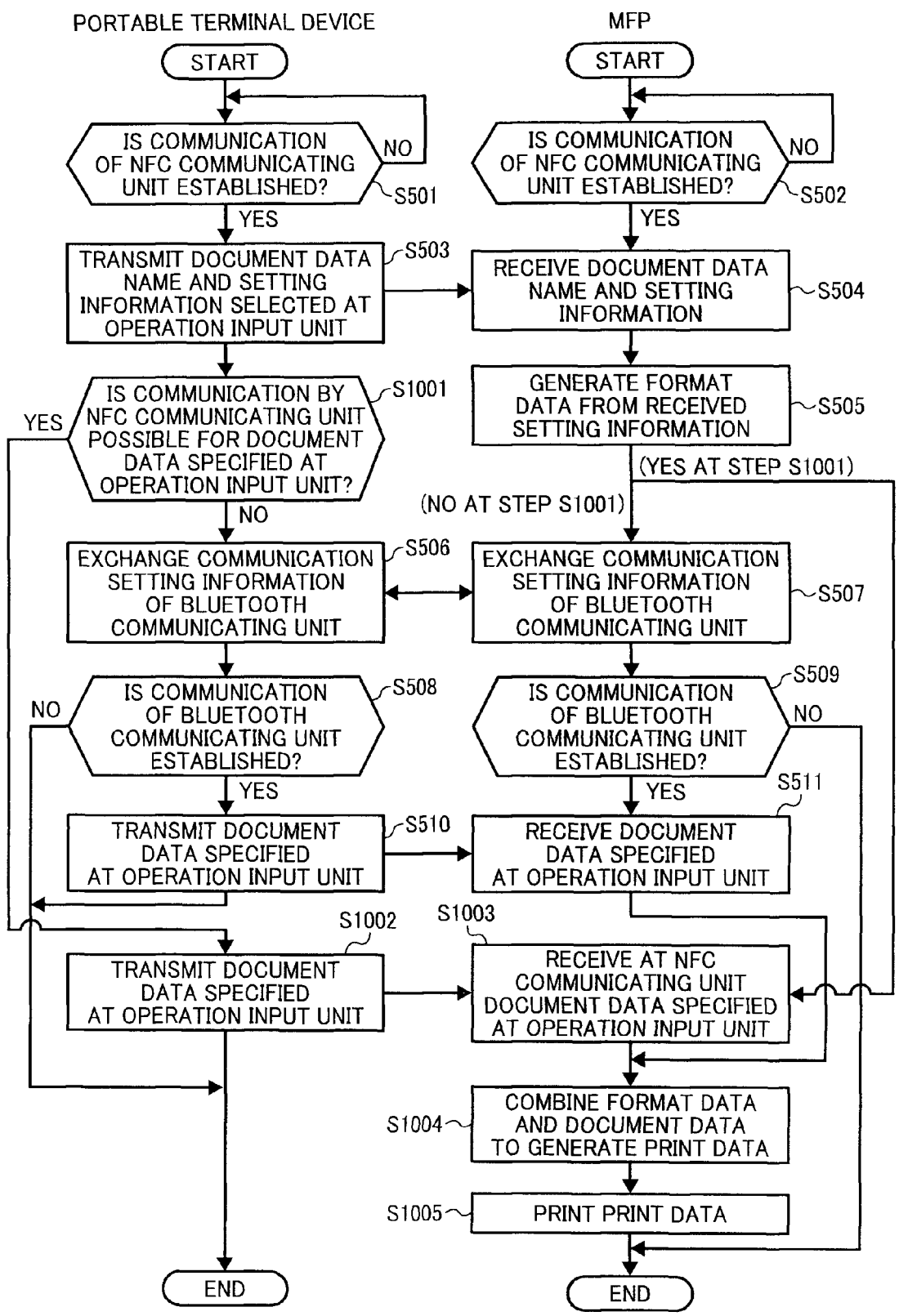
FIG. 10 is a flowchart of a wireless communication establishing procedure and a data processing procedure performed by the information processing system according to the fifth embodiment.

FIG. 10 is a flowchart of a wireless communication establishing procedure and a data processing procedure performed by an information processing system 20 according to a fifth embodiment of the present invention.

The data storage unit 2030 stores data for using the functions of the MFP 100, and also stores a reference value for determining which of a communication by the NFC communicating unit or a communication by the Bluetooth communicating unit is to be performed (for example, "128 kilobytes" when "data capacity" is taken as a reference; "100 pages" when "the number of pages" is taken as a reference; "the extension in text file format (.txt)" when "file type" is taken as a reference; or "presence or absence of encryption" when "data details" is taken as a reference). Here, the encryption method may be arbitrary, such as public key encryption or secret key encryption.

The attribute determining unit 901 determines based on the reference value of the attribute of the document data stored in the data storage unit 2030 whether a communication is to be performed through the NFC communicating unit or the Bluetooth communicating unit. The reference value for use in determination of the attribute is fixedly stored in advance, such as "data capacity" or "the number of pages" as mentioned above. Alternatively, a reference value obtained by combining these reference values may be used for attribute determination.

Next, a process of establishing a wireless communication and a data transmitting process by the information processing system 20 configured as explained above to include the MFP 100 and the portable terminal device 200 are explained. FIG. 10 is a flowchart of a wireless communication establishing procedure and a data transmitting procedure performed by the information processing system. In the following explanation, the same process as that in the first to fourth embodiments is provided with the same reference numeral and is not explained herein, and only different processes are explained herein.

When the print setting information selected at the operation input unit 204 is transmitted from the NFC communicating unit 101 and is received by the NFC communicating unit 201 (Steps S503 and S504), the attribute determining unit 901 refers to the reference value of the attribute of the document data stored in the data storage unit 2030 to determine whether a communication by the NFC communicating unit is possible for the document data specified at the operation input unit 204 (Step S1001). For example, when "data capacity" is taken as the reference value of the attribute of the document data, if the file size of the specified document data is equal to or smaller than "128 kilobytes", it is determined that a communication by the NFC communicating unit is possible. If the file size is larger than "128 kilobytes", it is determined that a communication by the NFC communicating unit is not possible. Similarly, when "file type" is taken as the reference value of the attribute of the document data, if the specified document data has an extension ".txt", it is determined that a communication by the NFC communicating unit is possible. If the document data does not have an extension ".txt", it is determined that a communication by the NFC communicating unit is not possible.

When the attribute determining unit 901 determines that a communication by the NFC communicating unit is possible ("Yes" at Step S1001), the NFC communicating unit 201 transmits the document data specified at the operation input unit 204 to the NFC communicating unit 101 (Step S1002). The NFC communicating unit 101 then receives the document data transmitted from the NFC communicating unit 201 (Step S1003). The data processing unit 104 then combines the document data received by the NFC communicating unit 101 (Step S1003) or the document data received by the Bluetooth communicating unit 102 (Step S511) and the format data generated at Step S505 together to generate print data (Step S1004), and causes the print data to be printed (Step S1005).

On the other hand, when the attribute determining unit 901 determines that a communication by the NFC communicating unit is not possible ("No" at Step S1001), processes similar to those in the first embodiment, such as Step S506, are performed.

In this manner, the communication determining unit 206 further includes the attribute determining unit 901 that determines an attribute of the substance information containing a document or an image. When the communication determining unit 206 determines that a communication by the NFC communicating unit 201 is possible, the NFC communicating unit 201 transmits the substance information according to the attribute of the substance information determined by the attribute determining unit 901. When the communication determining unit 206 determines that a communication by the NFC communicating unit 201 is not possible, the Bluetooth communicating unit 202 transmits the substance information according to the attribute of the substance information determined by the attribute determining unit 901. Therefore, a communication connection process at the portable terminal device can be reduced, and the communication can be performed safely.

Also, when the attribute determining unit 901 satisfies a predetermined condition, the NFC communicating unit 201 transmits the substance information containing a document or an image. Therefore, a communication connection process at the portable terminal device can be reduced, and the communication can be performed more safely.

Furthermore, the predetermined condition is set such that the size of the substance information containing a document or an image is equal to or smaller than a predetermined size. With this, a communication connection process at the portable terminal device can be reduced according to the capacity.

Still further, the predetermined condition is set such that the size of the substance information containing a document or an image is equal to or smaller than a predetermined number of pages. With this, a communication connection process at the portable terminal device can be reduced according to the number of pages.

Still further, the predetermined condition is set such that the substance information containing a document or an image is created in a predetermined format. With this, a communication connection process at the portable terminal device can be reduced according to the format of the data.

Still further, the predetermined condition is set such that a piece of attribution information indicates a secret state. With this, a safer communication operation can be ensured.

In the fifth embodiment, in view of a rapid connection process and increased security, in the portable terminal device 2000, the attribute of the document data, such as the size of the data, the number of pages, or the degree of confidentiality, is first determined, and then a communication by the NFC communicating unit or a communication by the Bluetooth communicating unit is performed. Then, the data processing unit 104 of the MFP 100 generates print data for printing. However, depending on the type of the MFP 100, the MFP may have a processing capability inferior to that of the portable terminal device 200. In the following, the case is explained in which print data obtained by combining the print setting information and the document data is generated by the portable terminal device 200, the attribute of the print data is determined, and then the print data is transmitted to the MFP 100, which simply receives the print data. The device configuration of an information processing system according to a sixth embodiment of the present invention is similar to that of the fifth embodiment, and therefore explanation of each structure by using a block diagram is omitted herein. A wireless communication establishing procedure and a data processing procedure are now explained by using a flowchart. In the following explanation, the same process as that in the fifth embodiment is provided with the same reference numeral and is not explained herein, and only different processes are explained herein.

Figure 11:
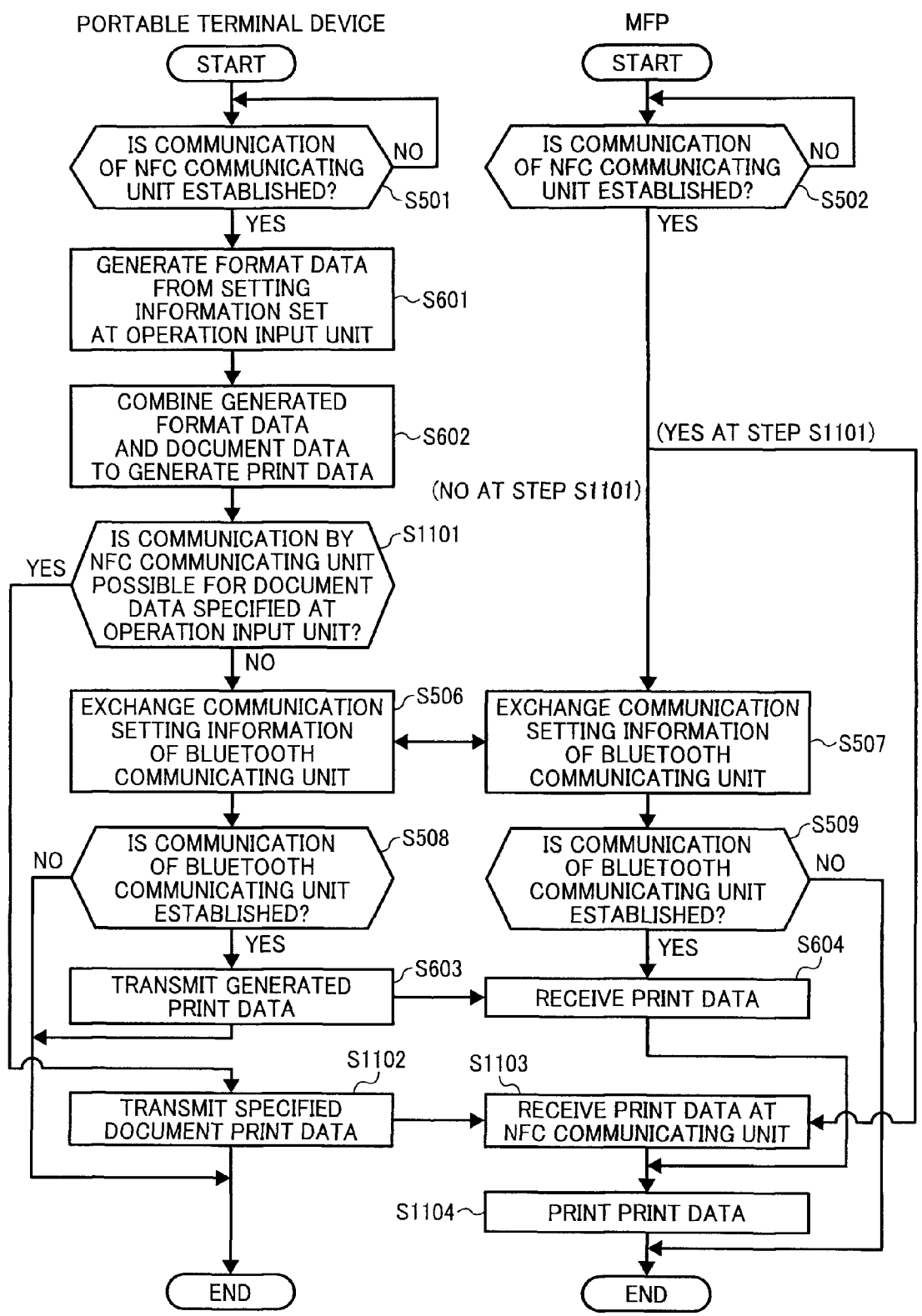
FIG. 11 is a flowchart of a wireless communication establishing procedure and a data processing procedure performed by an information processing system according to a sixth embodiment.

FIG. 11 is a flowchart of a wireless communication establishing procedure and a data processing procedure performed by an information processing system 20 according to the sixth embodiment.

First, in the portable terminal device 2000, the NFC communicating unit 201 performs the processes in the first and second embodiments, such as Step S501. When the data processing unit 207 generates print data (Step S602), the attribute determining unit 901 refers to the reference value of the attribute of the document data specified at the operation input unit 204 to determine whether a communication by the NFC communicating unit is possible for the document data specified at the operation input unit 204 (Step S1101).

Then, when the attribute determining unit 901 determines that a communication by the NFC communicating unit is possible ("Yes" at Step S1101), the NFC communicating unit 201 transmits the document data specified at the operation input unit 204 to the NFC communicating unit 101 (Step S1102). The NFC communicating unit 101 then receives the document data transmitted from the NFC communicating unit 201 (Step S1103). The data processing unit 104 then causes the print data received at Step S604 or Step S1103 to be printed (Step S1104).

On the other hand, when the attribute determining unit 901 determines that a communication by the NFC communicating unit is not possible ("No" at Step S1101), processes similar to those in the first and second embodiments are performed to print the print data.

In this manner, even when the processing capability of the MFP 100 is low, the processes similar to those in the fifth embodiment can be performed.

In the first to sixth embodiments, which of a communication by the NFC communicating unit or a communication by the Bluetooth communicating unit is to be performed is determined based on the communication area or, in view of a rapid connection process and increased security, based on the attribute of the document data, such as the size of the data, the number of pages, or the degree of confidentiality, any one of which is suitable for each embodiment. By combining these factors, a communication with a less burden on the user can be performed safely. Thus, in the following, the case of combining the first to sixth embodiments is explained. The device configuration of an information processing system according to a seventh embodiment of the present invention is similar to that of the fifth embodiment, and therefore explanation of each structure by using a block diagram is omitted herein. A wireless communication establishing procedure and a data processing procedure are now explained by using a flowchart. In the following explanation, the same process as that in the fifth embodiment is provided with the same reference numeral and is not explained herein, and only different processes are explained herein.

Figure 12:
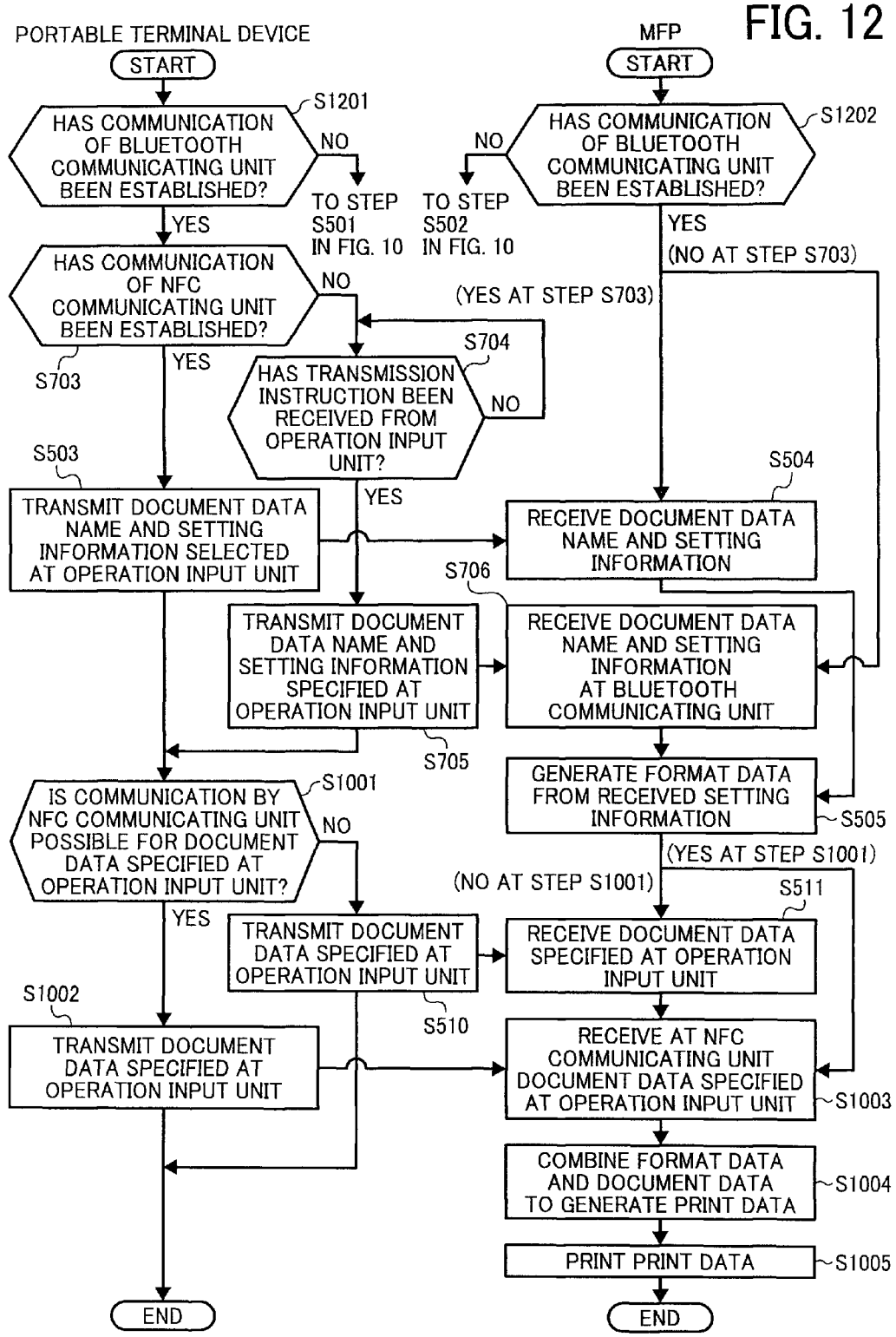
FIG. 12 is a flowchart of a wireless communication establishing procedure and a data processing procedure performed by an information processing system according to a seventh embodiment.

FIG. 12 is a flowchart of a wireless communication establishing procedure and a data processing procedure performed by an information processing system 20 according to the seventh embodiment.

First, in the portable terminal device 2000, the Bluetooth communicating unit 202 determines whether a communication between the Bluetooth communicating unit 202 of the portable terminal device 2000 and the Bluetooth communicating unit 102 of the MFP 100 has already been established (Step S1201). When it is determined that a communication with the Bluetooth communicating unit 102 of the MFP 100 has not been established ("No" at Step S1201), the procedure goes to Step S501 in the fifth embodiment depicted in FIG. 10 to perform the processes in the fifth embodiment.

Also, in the MFP 100, the Bluetooth communicating unit 102 determines whether a communication with the Bluetooth communicating unit 202 of the portable terminal device 2000 has already been established (Step S1202). When it is determined that a communication with the Bluetooth communicating unit 202 of the portable terminal device 2000 has not been established ("No" at Step S1202), the procedure goes to Step S502 in the fifth embodiment depicted in FIG. 10 to perform the processes in the fifth embodiment.

Then, when the Bluetooth communicating unit 202 determines that a communication between the Bluetooth communicating unit 202 and the Bluetooth communicating unit 102 has been established ("Yes" at Step S1201), the processes in the first to sixth embodiments are sequentially performed for printing the print data.

In the seventh embodiment, the case of combining the first to sixth embodiments is explained. However, depending on the type of the MFP 100, the MFP may have a processing capability inferior to that of the portable terminal device 200. In the following, the case is explained in which print data obtained by combining the print setting information and the document data is generated by the portable terminal device 200, the print data is transmitted through a communication by the NFC communicating unit or a communication by the Bluetooth communicating unit to the MFP 100, which simply receives the print data for printing. The device configuration of an information processing system according to an eighth embodiment of the present invention is similar to that of the seventh embodiment, and therefore explanation of each structure by using a block diagram is omitted herein. A wireless communication establishing procedure and a data processing procedure are now explained by using a flowchart. In the following explanation, the same process as that in the seventh embodiment is provided with the same reference numeral and is not explained herein, and only different processes are explained herein.

Figure 13:
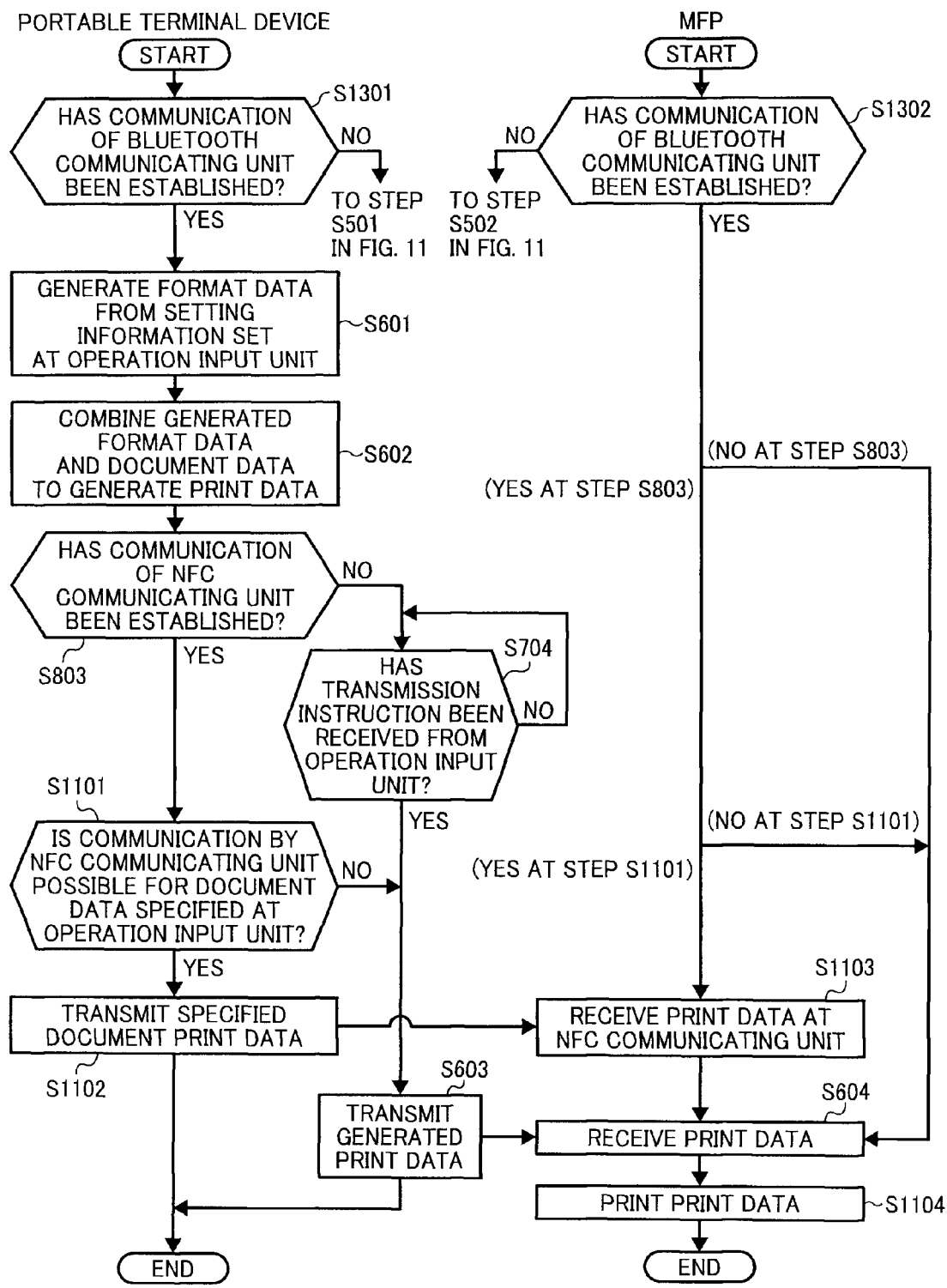
FIG. 13 is a flowchart of a wireless communication establishing procedure and a data processing procedure performed by an information processing system according to an eighth embodiment.

FIG. 13 is a flowchart of a wireless communication establishing procedure and a data processing procedure performed by an information processing system 10 according to the eighth embodiment.

First, in the portable terminal device 200, the communication determining unit 206 determines whether a communication between the Bluetooth communicating unit 202 of the portable terminal device 200 and the Bluetooth communicating unit 102 of the MFP 100 has already been established (Step S1301). When it is determined that a communication with the Bluetooth communicating unit 102 of the MFP 100 has not been established ("No" at Step S1301), the procedure goes to Step S501 in the sixth embodiment depicted in FIG. 11 to perform the processes in the sixth embodiment.

Also, in the MFP 100, the Bluetooth communicating unit 102 determines whether a communication with the Bluetooth communicating unit 202 of the portable terminal device 200 has already been established (Step S1302). When it is determined that a communication with the Bluetooth communicating unit 202 of the portable terminal device 200 has not been established ("No" at Step S1302), the procedure goes to Step S502 in the sixth embodiment depicted in FIG. 11 to perform the processes in the sixth embodiment.

Then, when the Bluetooth communicating unit 202 determines that a communication between the Bluetooth communicating unit 202 and the Bluetooth communicating unit 102 has been established ("Yes" at Step S1301), the processes in the first to sixth embodiments are sequentially performed for printing the print data.

In the first to eighth embodiments, the case is explained in which the data stored in the portable terminal device 200 or the portable terminal device 2000 is document data and the document data is printed by using the print function of the printer unit 105 of the MFP 100. However, the MFP 100 also includes the scanner unit 103, and it is possible to read the original of the document data by the scanner unit 103 for conversion to image data, transfer the image data from the MFP 100 to the portable terminal device 200 or the portable terminal device 2000 for storage in the data storage unit 203 of the portable terminal device 200 or the data storage unit 2030 of the portable terminal device 2000. In the following, the case of handling such image data is explained. The device configuration of an information processing system according to a ninth embodiment of the present invention is similar to that of the first to eighth embodiments, and therefore explanation of each structure by using a block diagram is omitted herein. A wireless communication establishing procedure and a data processing procedure are now explained by using a flowchart. In the following explanation, although the data to be handled is image data, the same processes as those in the first to eighth embodiments may be performed, such as a communication by the NFC communicating unit or the Bluetooth communicating unit and transmission and reception of the communication setting information. In such cases, the same process is provided with the same reference numeral and is not explained herein, and only different processes are explained herein.

Figure 14:
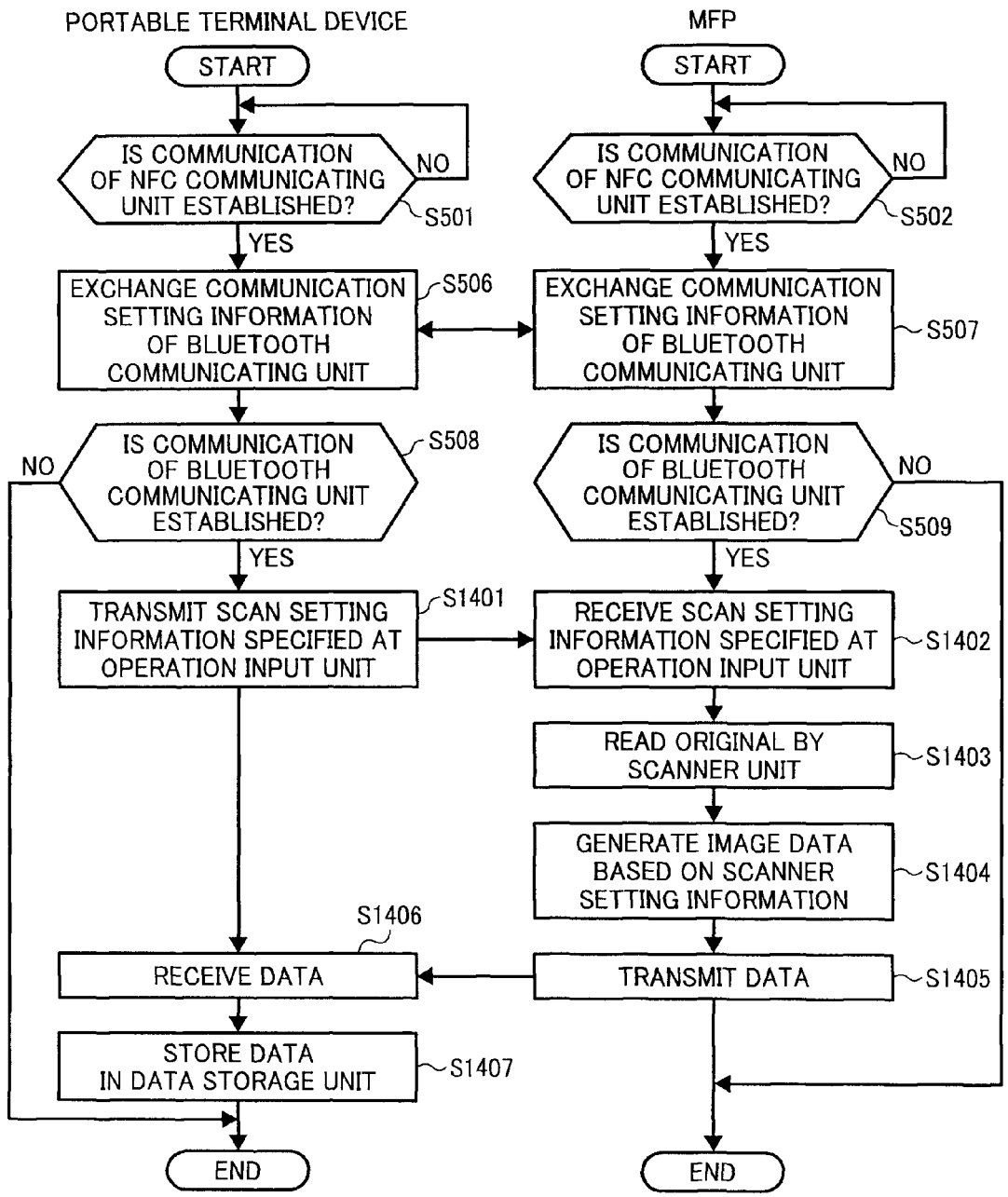
FIG. 14 is a flowchart of a wireless communication establishing procedure and a data processing procedure performed by an information processing system according to a ninth embodiment.

FIG. 14 is a flowchart of a wireless communication establishing procedure and a data processing procedure performed by an information processing system 10 according to the ninth embodiment.

Upon establishment of a communication between the Bluetooth communicating unit 202 and the Bluetooth communicating unit 102 (Steps S508 and S509), the NFC communicating unit 201 transmits the scan setting information specified at the operation input unit 204 to the NFC communicating unit 101 of the MFP 100 (Step S1401). The NFC communicating unit 101 then receives the scan setting information (Step S1402).

The scanner unit 103 then reads the original of the image data (Step S1403). The data processing unit 104 processes the original image read at Step S1403 to generate image data based on the scanner setting information received at Step S1402 (for example, "original type", "resolution", or "read size") (Step S1404).

Then, the Bluetooth communicating unit 102 transmits the generated image data to the Bluetooth communicating unit 202 of the portable terminal device 2000 (Step S1405). The Bluetooth communicating unit 202 then receives the image data (Step S1406). The data processing unit 207 then stores the received image data in the data storage unit 2030 (Step S1407).

In the ninth embodiment, the case is explained in which the original of the document data is read at the scanner unit 103 for conversion to image data, and the image data is transferred from the MFP 100 to the portable terminal device 200 or the portable terminal device 2000 for storage in the data storage unit 203 of the portable terminal device 200 or the data storage unit 2030 of the portable terminal device 2000. However, in some cases, the user may move away from the location of the MFP 100 and cannot perform communication by the NFC communicating unit. In the following, the case is explained in which, even when communication by the NFC communicating unit is impossible, communication by the Bluetooth communicating unit is performed for transmission and reception of the scan setting information. The device configuration of an information processing system according to a tenth embodiment of the present invention is similar to that of the ninth embodiment, and therefore explanation of each structure by using a block diagram is omitted herein. A wireless communication establishing procedure and a data processing procedure are now explained by using a flowchart. In the following explanation, the same process as that in the ninth embodiment is provided with the same reference numeral and is not explained herein, and only different processes are explained herein.

Figure 15:
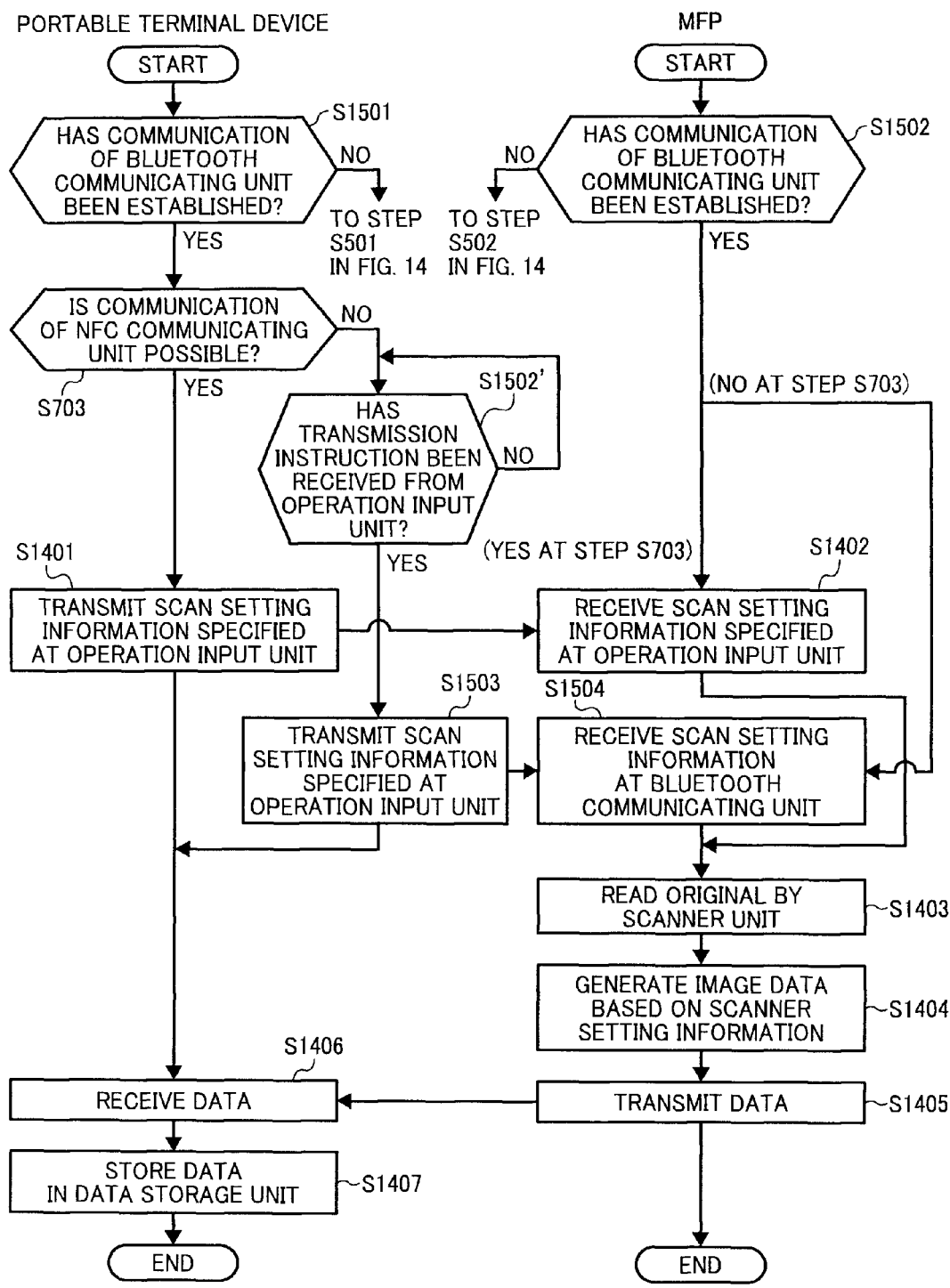
FIG. 15 is a flowchart of a wireless communication establishing procedure and a data processing procedure performed by an information processing system according to a tenth embodiment.

FIG. 15 is a flowchart of a wireless communication establishing procedure and a data processing procedure performed by an information processing system 10 according to the tenth embodiment.

First, in the portable terminal device 200, the Bluetooth communicating unit 202 determines whether a communication between the Bluetooth communicating unit 202 of the portable terminal device 200 and the Bluetooth communicating unit 102 of the MFP 100 has already been established (Step S1501). When it is determined that a communication with the Bluetooth communicating unit 102 of the MFP 100 has not been established ("No" at Step S1501), the procedure goes to Step S501 in the ninth embodiment to perform the processes in the ninth embodiment.

Also, in the MFP 100, the Bluetooth communicating unit 102 determines whether a communication with the Bluetooth communicating unit 202 of the portable terminal device 200 has already been established (Step S1502). When it is determined that a communication with the Bluetooth communicating unit 202 of the portable terminal device 200 has not been established ("No" at Step S1502), the procedure goes to Step S502 in the ninth embodiment depicted in FIG. 14 to perform the processes in the ninth embodiment.

Then, it is determined whether a communication with the NFC communicating unit 201 is possible (Step S703). When it is determined that a communication with the NFC communicating unit 201 is not possible ("No" at Step S703), the communication determining unit 206 determines whether the operation input unit 204 has received a transmission instruction for scan setting information from the user (Step S1502'). When determining that the operation input unit 204 has not received a transmission instruction ("No" at Step S1502'), the communication determining unit 206 waits until the operation input unit 204 receives a transmission instruction.

On the other hand, when the communication determining unit 206 determines that a transmission instruction has been provided to the operation input unit 204 ("Yes" at Step S1502'), the Bluetooth communicating unit 202 transmits scan setting information specified by the operation input unit 204 to the Bluetooth communicating unit 102 (Step S1503). The Bluetooth communicating unit 102 then receives the scan setting information from the Bluetooth communicating unit 202 (Step S1504).

In the ninth and tenth embodiments, depending on whether a communication between the portable terminal device 200 and the MFP 100 is possible by the NFC communicating units or the Bluetooth communicating units, that is, depending on whether the portable terminal device 200 or the MFP 100 is present in the relevant communication area, a communication method of communicating the scan setting information, the image data, and others is determined. However, if the data capacity is smaller than a predetermined number of bytes or a predetermined number of pages, or the data is highly confidential, for example, irrespective of the communication area between the portable terminal device 200 and the MFP 100, transmission and reception of the image data obtained by scanning through communication by NFC communicating unit may be desirable in view of a rapid connection process for the former case of a small data capacity and in view of increased security for the latter case of confidentiality. In the following, the case is explained in which the portable terminal device 200 first determines an attributes of document data, such as the data size, the number of pages, or the degree of confidentiality, and then a communication by the NFC communicating unit or a communication by the Bluetooth communicating unit is performed. The device configuration of an information processing system according to an eleventh embodiment of the present invention is similar to that of the ninth or tenth embodiment, and therefore explanation of each structure by using a block diagram is omitted herein. A wireless communication establishing procedure and a data processing procedure are now explained by using a flowchart. In the following explanation, although the data to be handled is image data, the same processes as that in the first to eighth embodiments may be performed, such as a communication with the NFC communicating unit or the Bluetooth communicating unit and transmission and reception of the communication setting information. In such cases, the same process is provided with the same reference numeral and is not explained herein, and only different processes are explained herein.

Figure 16:
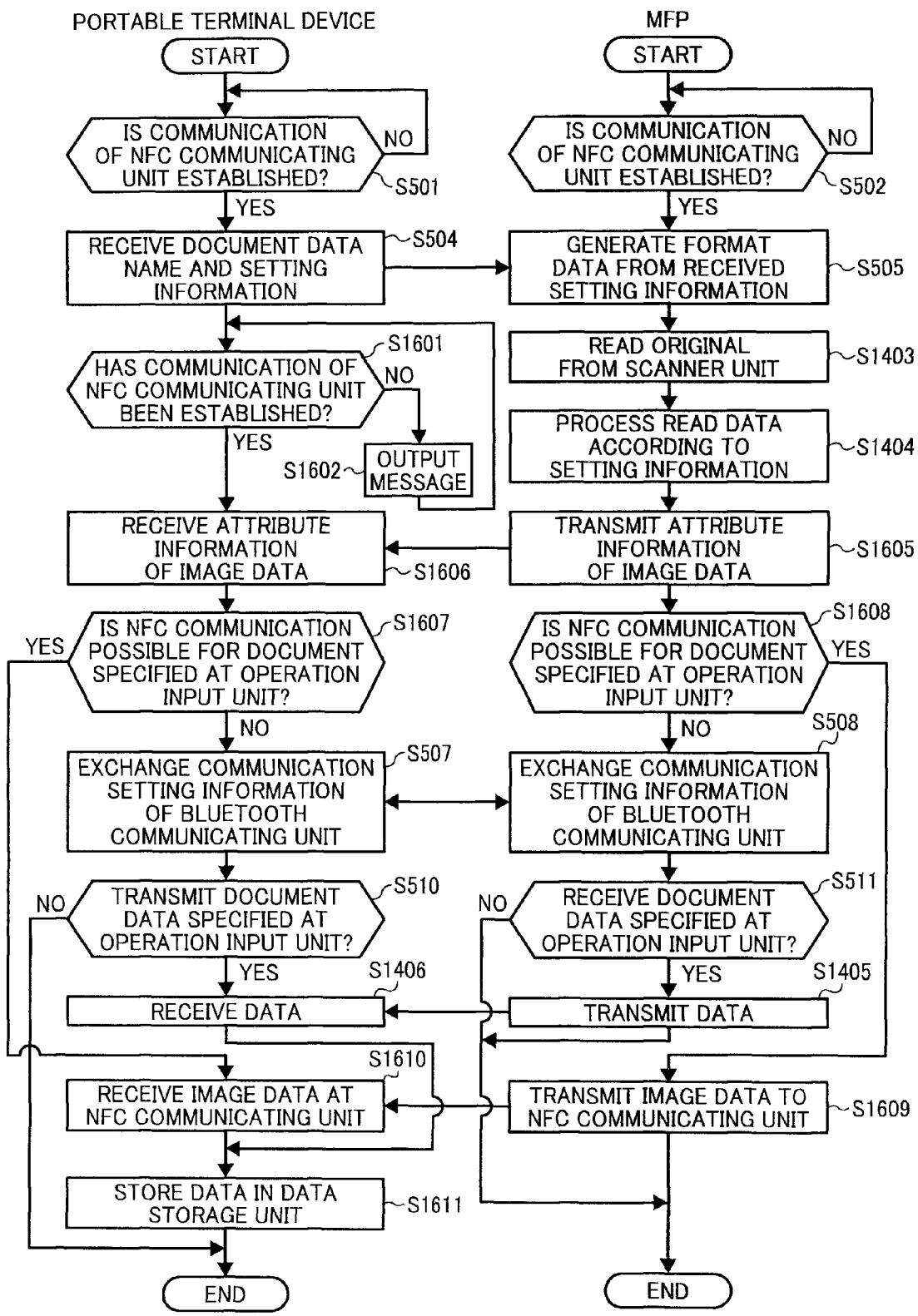
FIG. 16 is a flowchart of a wireless communication establishing procedure and a data processing procedure performed by an information processing system according to an eleventh embodiment.

FIG. 16 is a flowchart of a wireless communication establishing procedure and a data processing procedure performed by an information processing system 10 according to the eleventh embodiment.

When the NFC communicating unit 201 transmits the scanner setting information specified at the operation input unit 204 to the NFC communicating unit 101 (Step S504) and the NFC communicating unit 101 then receives the scanner setting information (Step S505), the communication determining unit 206 determines again whether a communication between the NFC communicating unit 201 and the NFC communicating unit 101 has been established (Step S1601). When the communication determining unit 206 determines that a communication by the NFC communicating unit 201 has been established ("Yes" at Step S1601), the NFC communicating unit 101 transmits the attribute information of the image data to the NFC communicating unit 201. The NFC communicating unit 201 then receives the attribute information (Steps S1605 and S1606).

On the other hand, when the communication determining unit 206 determines that a communication by the NFC communicating unit 201 has not been established ("No" at Step S1601), the communication determining unit 206 outputs to the user a message, such as "Come near to the MFP due to weak radio field intensity" (Step S1602), waiting until a condition of radio field intensity is satisfied.

Then, the attribute determining unit 901 determines from the attribute information of the image data whether a communication by the NFC communicating unit 201 is possible (Steps S1607 and S1608). Then, processes are performed, such as a process of establishing a communication by the Bluetooth communicating unit (such as Steps S507 and S508). The NFC communicating unit 101 then transmits the image data to the NFC communicating unit 201 (Steps S1609 and S1610). The image data received by the NFC communicating unit 201 is stored in the data storage unit 2030 (Step S1611).

In the eleventh embodiment, which of a communication by the NFC communicating unit or a communication by the Bluetooth communicating unit is to be performed is determined based on the communication area or, in view of a rapid connection process and increased security, the attribute of the image data is determined at the portable terminal device 2000, such as the size of the image data, the number of pages, or the degree of confidentiality, any one of which is suitable for each embodiment. By combining these factors, a communication with a less burden on the user can be performed safely. Thus, in the following, the case of combining the ninth to eleventh embodiments is explained. The device configuration of an information processing system according to a twelfth embodiment of the present invention is similar to that of the ninth to eleventh embodiments, and therefore explanation of each structure by using a block diagram is omitted herein. A wireless communication establishing procedure and a data processing procedure are now explained by using a flowchart. In the following explanation, although the data to be handled is image data, the same processes as that in the first to eighth embodiments may be performed, such as a communication with the NFC communicating unit or the Bluetooth communicating unit and transmission and reception of the communication setting information. In such cases, the same process is provided with the same reference numeral and is not explained herein, and only different processes are explained herein.

Figure 17A:
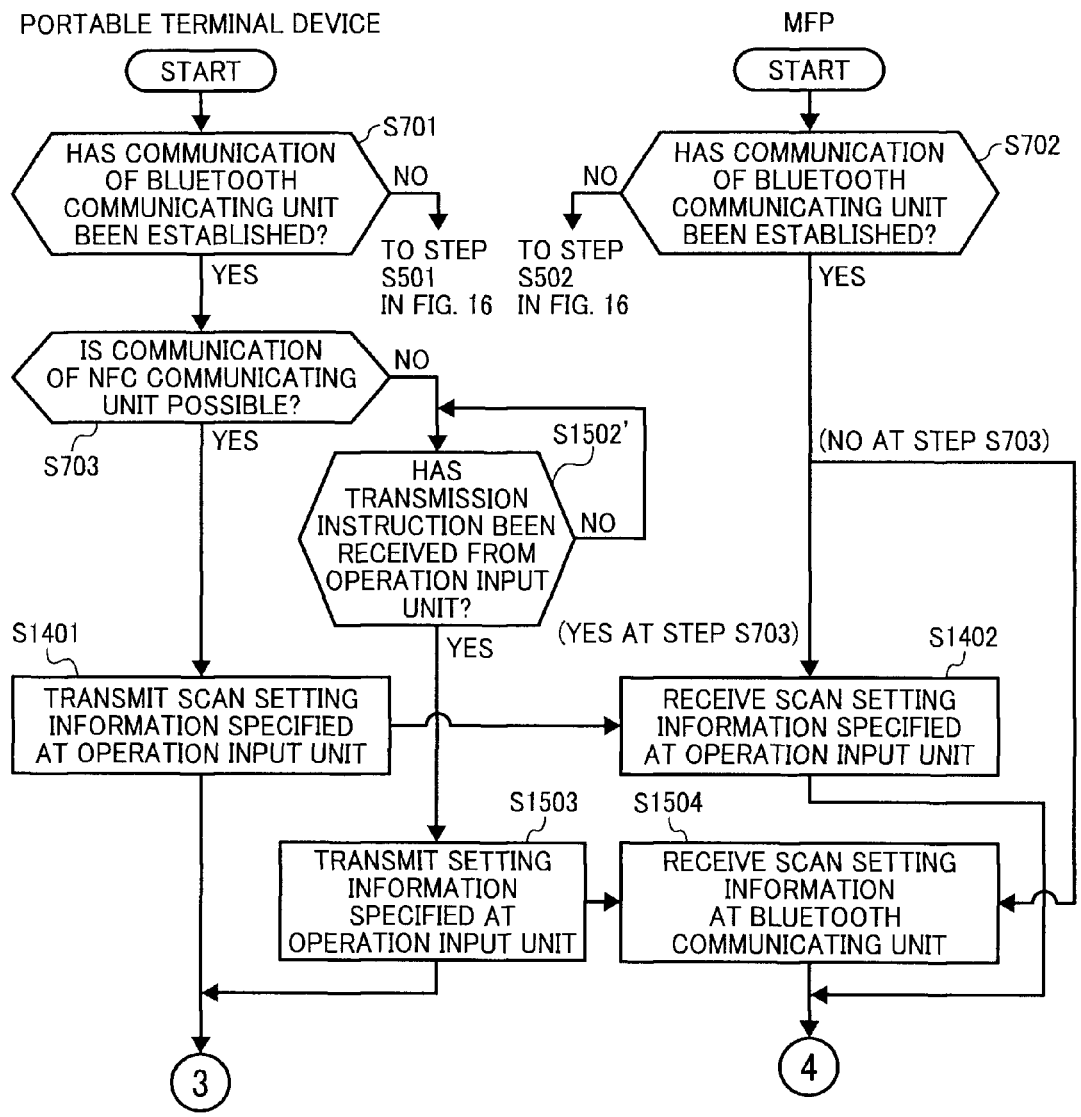
FIGS. 17A and 17B are flowcharts of a wireless communication establishing procedure and a data processing procedure performed by an information processing system according to a twelfth embodiment.
Figure 17B:
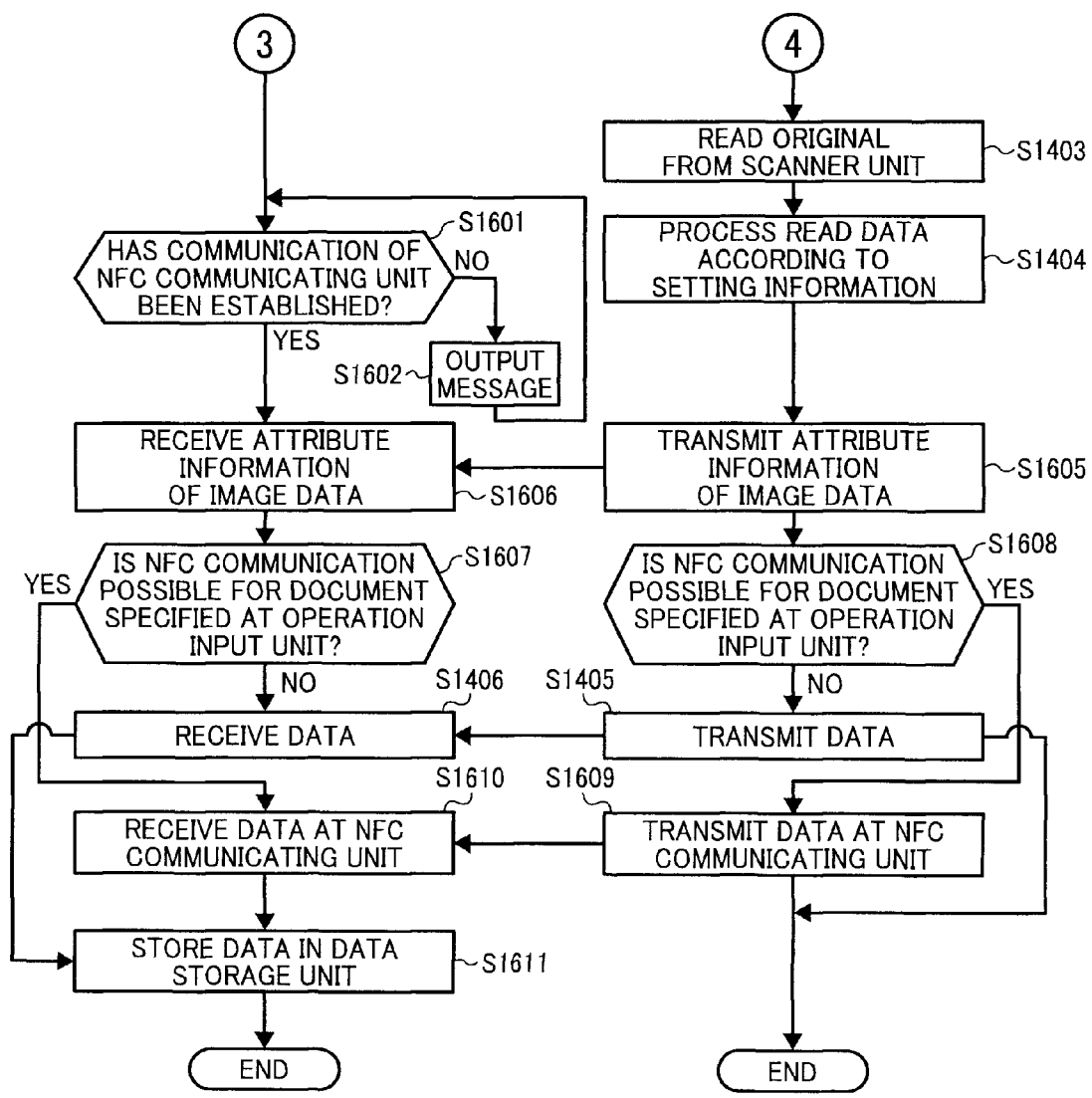

FIGS. 17A and 17B are flowcharts of a wireless communication establishing procedure and a data processing procedure performed by an information processing system 10 according to the twelfth embodiment.

First, in the portable terminal device 200, the communication determining unit 206 determines whether a communication between the Bluetooth communicating unit 202 of the portable terminal device 200 and the Bluetooth communicating unit 102 of the MFP 100 has been established (Step S701). When it is determined that a communication with the Bluetooth communicating unit 102 of the MFP 100 has not been established ("No" at Step S701), the procedure goes to Step S501 in the eleventh embodiment depicted in FIG. 16 to perform the processes in the eleventh embodiment.

Also, in the MFP 100, the Bluetooth communicating unit 102 determines whether a communication with the Bluetooth communicating unit 202 of the portable terminal device 200 has been established (Step S702). When it is determined that a communication with the Bluetooth communicating unit 202 of the portable terminal device 200 has not been established ("No" at Step S702), the procedure goes to Step S502 in the eleventh embodiment depicted in FIG. 16 to perform the processes in the eleventh embodiment.

When the communication determining unit 206 determines that a communication between the NFC communicating unit 201 and the NFC communicating unit 101 has been established ("Yes" at Step S701), the processes in the ninth to eleventh embodiments are sequentially performed, and the image data is then stored in the data storage unit 2030.

In this manner, by using the setting information as the print-related information, the data processing unit 104 causes printing of the substance information containing the document or image received from the portable terminal device 200 or the portable terminal device 2000 via the Bluetooth communicating unit 102 through non-contact communication, based on the print-related information. With this, the burden of a print operation and a communication operation can be reduced.

Also, by using the scan-related information as the setting information, based on the information for scanning the substance information containing the document or image, the data processing unit 104 causes the original to be scanned based on the scan-related information received from the portable terminal device 200 or the portable terminal device 2000 via the Bluetooth communicating unit 102 through non-contact communication to generate image data. The NFC communicating unit 101 then transmits the generated image data to the portable terminal device via the NFC communicating unit 101. With this, the burden of a scanning operation and a communication operation can be reduced.

Figure 18:
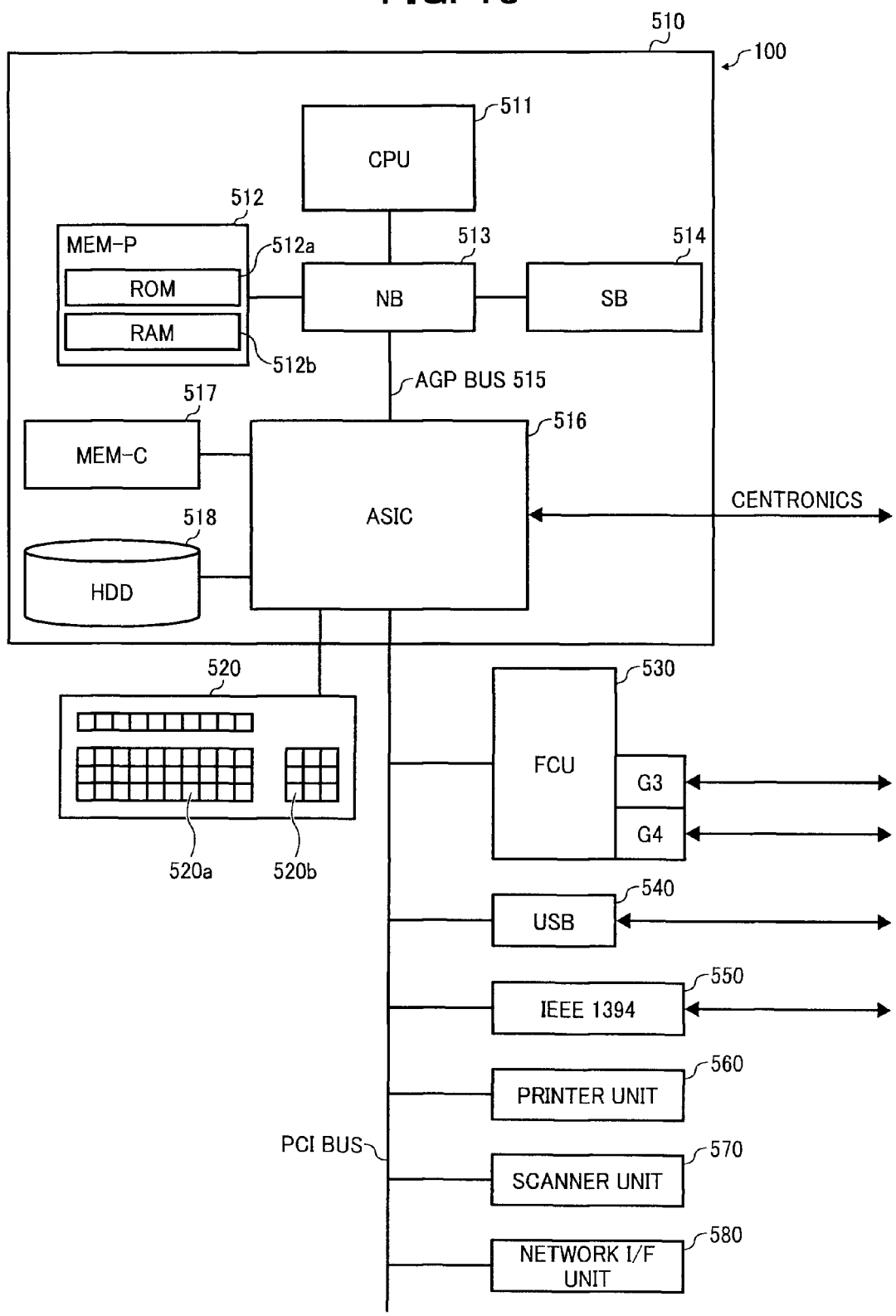
FIG. 18 is a drawing that explains the hardware configuration of an MFP according to first to twelfth embodiment.

Next, the hardware configuration of the MFP 100 is explained. FIG. 18 is a drawing that explains the hardware configuration of the MFP according to the embodiments. As depicted in FIG. 18, the MFP 100 is configured with a controller 510, a printer unit 560, and a scanner unit 570 being connected to each other via a peripheral component interconnect (PCI) bus. The controller 510 is a controller that controls the entire MFP 100, rendering, communications, and an input from an operating unit 520. Here, the printer unit 560 or the scanner unit 570 includes an image processing portion for error diffusion for binarization and gamma transformation for gray-scale correction, for example. The operating unit 520 includes an operation displaying unit 520a that causes original image information of the original read by the scanner unit 570 and the like to be displayed on a liquid crystal display (LCD) and also accepts an input from the operator via a touch panel, and a keyboard unit 520b that accepts a key input from an operator.

With an application switching key of the operating unit 520, the MFP 100 according to the embodiments can sequentially switch and select a document-box function, a copy function, a printer function, a scanner function, and a FAX function. When the document-box function is selected, the mode becomes a document-box mode. When the copy function is selected, the mode becomes a copy mode. When the printer function is selected, the mode becomes a printer mode. When the scanner function is selected, the mode becomes a scanner mode. When the FAX mode is selected, the mode becomes a FAX mode.

The controller 510 includes a central processing unit (CPU) 511, which is a main portion of a computer; a system memory (MEM-P) 512; a northbridge (NB) 513; a southbridge (SB) 514; an application specific integrated circuit (ASIC) 516; a local memory (MEM-C) 517, which is a storage unit; and a hard disk drive (HDD) 518, which is a storage unit, with the NB 513 and the ASIC 516 being connected therebetween with an accelerated graphics port (AGP) bus 515. Also, the MEM-P 512 further includes a read only memory (ROM) 512a and a random access memory (RAM) 512b.

The CPU 511 performs controls over the entire MFP 100, includes a chip set formed of the NB 513, the MEM-P 512, and the SB 514, and is connected to other devices via this chip set.

The NB 513 is a bridge for connection of the CPU 511 with the MEM-P 512, the SB 514, and the AGP bus 515, and includes: a memory controller that controls, for example, reading and writing with respect to the MEM-P 512; a PCI master; and an AGP target.

The MEM-P 512 is a system memory for use as, for example, a memory for storing programs and data, a memory for developing programs and data, or a printer memory for rendering, and includes the ROM 512a and the RAM 512b. The ROM 512a is a read-only memory for use as a memory for storing programs that controls the operation of the CPU 511 and data, whilst the RAM 512b is a writable and readable memory for use as, for example, a memory for developing programs and data or a printer rendering memory.

The SB 514 is a bridge for connection of the NB 513 with PCI devices and peripheral devices. The SB 514 is connected to the NB 513 via the PCI bus. To this PCI bus, a network interface (I/F) unit 580 is also connected, for example.

The ASIC 516 is an IC dedicated to image processing, contains hardware components for image processing, and serves as a bridge for connecting the AGP bus 515, the PCI bus, the HDD 518, and the MEM-C 517. The ASIC 516 includes: a PCI target; an AGP master; an arbiter (ARB), which is a core of the ASIC 516; a memory controller that controls the MEM-C 517; a plurality of direct memory access controllers (DMACs) for image data rotation and others by a hardware logic and others; and a PCI unit for data transfer with the printer unit 560 and the scanner unit 570 through the PCI bus. To the ASIC 516, a Fax control unit (FCU) 530, a USB 540, and an IEEE 1394 interface 550 are connected via the PCI bus.

The MEM-C 517 is a local memory for use as an image buffer for copying or a coding buffer. The HDD 518 is a storage for storing image data, programs that control the operation of the CPU 511, font data, and forms.

The AGP bus 515 is a bus interface for a graphics accelerator card suggested for increasing the speed of graphic processing, and increases the speed of the graphics accelerator card by directly accessing the MEM-P 512 with a high throughput.

The program executed on the MFP 100 according to the embodiments is provided as being incorporated in advance in a ROM or the like. The program executed on the MFP 100 according to the embodiments may be configured to be provided as being recorded as a file in an installable format or an executable format on a computer-readable recording medium, such as a compact disk-read only memory (CD-ROM), a flexible disk (FD), a compact disk-recordable (CD-R), or a digital versatile disk (DVD).

Furthermore, the program executed on the MFP 100 according to the embodiments may be configured to be provided as being stored on a computer connected to a network, such as the Internet, and then being downloaded through the network. Also, the program executed on the MFP 100 according to the embodiments may be provided or distributed through a network, such as the Internet.

The program executed on the MFP 100 according to the embodiments has a module configuration including each of the components explained above (the NFC communicating unit, the Bluetooth communicating unit, the data processing unit, and the FAX transmitting/receiving unit, for example). As actual hardware, with the CPU (processor) reading the program from the ROM for execution, each unit explained above is loaded onto a main storage device, thereby generating each of the NFC communicating unit, the Bluetooth communicating unit, the data processing unit, and the FAX transmitting/receiving unit on the main storage device.

Also, the program executed on the portable terminal device 200 according to the embodiments is provided as being incorporated in advance in a ROM or the like. The program executed on the portable terminal device 200 according to the embodiments may be configured to be provided as being recorded as a file in an installable format or an executable format on a computer-readable recording medium, such as a CD-ROM, an FD, a CD-R, or a DVD.

Furthermore, the program executed on the portable terminal device 200 according to the embodiments may be configured to be provided as being stored on a computer connected to a network, such as the Internet, and then being downloaded through the network. Also, the program executed on the portable terminal device 200 according to the embodiments may be provided or distributed through a network, such as the Internet.

The program executed on the portable terminal device 200 according to the embodiments has a module configuration including each of the components explained above (the NFC communicating unit and the Bluetooth communicating unit, for example). As actual hardware, with the CPU (processor) reading the program from the ROM for execution, each unit explained above is loaded onto a main storage device, thereby generating each of the NFC communicating unit and the Bluetooth communicating unit on the main storage device.

Here, in the embodiments, the MFP is exemplarily explained. However, the present invention is not restricted to the MFP, but can be applied to various apparatuses including a copier, a FAX, and a printer.

With reference to the attached drawings, a thirteenth embodiment of the present invention is explained. In the thirteenth embodiment, the case is explained in which the configurations and functions of the MFP and the portable terminal device explained above are applied to a car navigation system.

Figure 19:
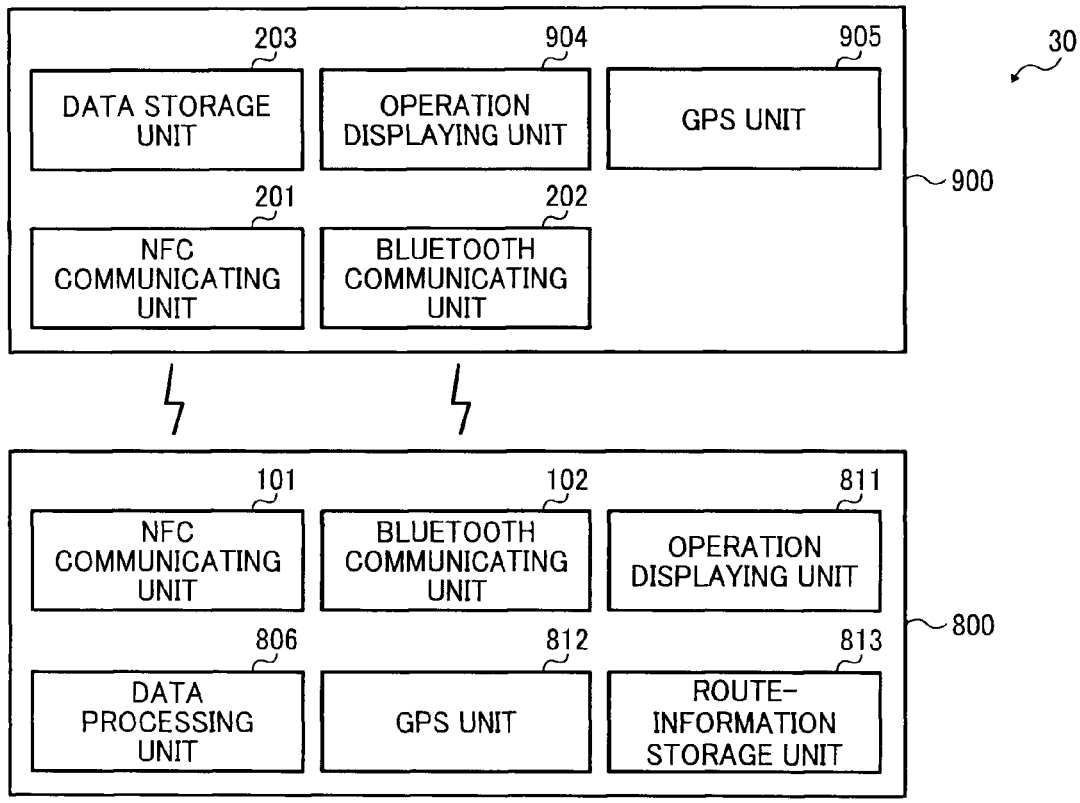
FIG. 19 is a block diagram of the configuration of a navigation system according to a thirteenth embodiment.

An example of configuration of the car navigation system to which the present invention is applied is explained, focusing on different parts from the first embodiment. The other parts are approximately similar to those in the first embodiment, and therefore are not explained herein and the explanation above is referred to. FIG. 19 is a block diagram of the configuration of a car navigation system 30 according to the thirteenth embodiment.

The car navigation system 30 according to the present embodiment includes a car navigation device 800 and a portable terminal device 900, with the car navigation device 800 and the portable terminal device 900 communicable with each other through two communicating units.

First, the portable terminal device 900 is explained. The portable terminal device 900 includes the NFC communicating unit 201, the Bluetooth communicating unit 202, the data storage unit 203, an operation displaying unit 904, a global positioning system (GPS) unit 905. Here, the configurations and functions of the NFC communicating unit 201, the Bluetooth communicating unit 202, and the data storage unit 203 are approximately similar to those in the first embodiment, and therefore are not explained herein.

Figure 20:
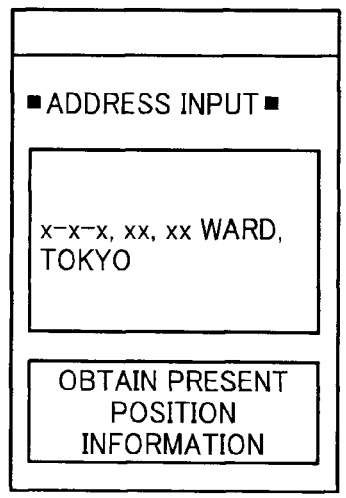
FIG. 20 is a drawing that explains one example of an input screen of destination information.
Figure 21:
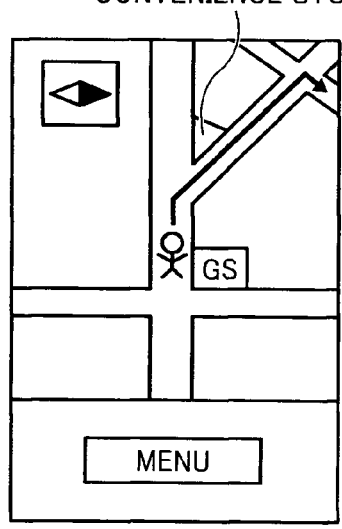
FIG. 21 is a drawing that explains one example of a display screen on which route information is displayed.

The operation displaying unit 904 accepts an input of destination information. FIG. 20 is a drawing that explains one example of an input screen of destination information. As depicted in FIG. 20, as destination information, an input of the address of the destination is accepted. Also, the operation displaying unit 904 displays route information from the present position to the destination transmitted from the car navigation device 800. FIG. 21 is a drawing that explains one example of a display screen on which route information is displayed. Here, the route information is information containing cartographic data required for route display.

The GPS unit 905 specifies the present position on the earth by using a satellite positioning system. When a button for obtaining the present position information as depicted in FIG. 20 is pressed, the GPS unit 905 specifies the present position of the portable terminal device 900 on the earth.

The car navigation device 800 includes the NFC communicating unit 101, the Bluetooth communicating unit 102, a data processing unit 806, an operation displaying unit 811, a GPS unit 812, and a route-information storage unit 813. Here, the configurations and functions of the NFC communicating unit 101 and the Bluetooth communicating unit 102 are similar to those in the first embodiment, and therefore are not explained herein.

The data processing unit 806 performs a route search from present-position information and destination information transmitted from the portable terminal device 900 to obtain route information from the route-information storage unit 813. The operation displaying unit 811 causes the route information obtained by the data processing unit 806 to be displayed on a display screen. As with the GPS unit 905, the GPS unit 812 uses the satellite positioning system to specify the present position of the car navigation device 800 on the earth.

The route-information storage unit 813 has stored therein route information of an area in which the car navigation device 800 performs a route search. Here, the route information stored in the route-information storage unit 813 is data retained in a general car navigation device for performing a normal navigation process.

With the configuration of the car navigation device 800 as explained above, the setting information, such as destination information, is transmitted from the portable terminal device 900 via the NFC communicating unit or the Bluetooth communicating unit to the car navigation device 800. Then, from the destination information and others, the data processing unit 806 generates information about a predetermined range of cartographic data stored in the route-information storage unit 813 (for example, cartographic information within a 5-km radius of the destination) for transmission to the portable terminal device 900, in which the data is stored in the data storage unit 203. In this manner, cartographic information can be obtained in a communication procedure similar to that in the case of the MFP explained above. With such processes, even when getting off an automobile and heading for the destination on foot, the user can use navigation to the destination within a communicable range as long as the user carries the portable terminal device.

While the present invention has been explained by using the first to thirteenth embodiments, various changes and modifications can be added to these embodiments. Here, the configurations and functions explained in the first to thirteenth embodiments can be freely combined.

According to an aspect of the present invention, an effect can be achieved of allowing the user to select a desirable communication method, thereby reducing the burden of a communication operation.

Furthermore, according to another aspect of the present invention, an effect can be achieved that the communication connection process in the portable terminal device can be reduced, thereby allowing communication safely.

Moreover, according to still another aspect of the present invention, an effect can be achieved that the communication connection process in the portable terminal device can be reduced, thereby allowing communication safely.

Furthermore, according to still another aspect of the present invention, an effect can be achieved that the communication connection process in the portable terminal device can be reduced according to the capacity.

Moreover, according to still another aspect of the present invention, an effect can be achieved that the communication connection process in the portable terminal device can be reduced according to the number of pages.

Furthermore, according to still another aspect of the present invention, an effect can be achieved that the communication connection process in the portable terminal device can be reduced according to the format of the data.

Moreover, according to still another aspect of the present invention, an effect can be achieved that a safer communication operation can be ensured.

Furthermore, according to still another aspect of the present invention, an effect can be achieved of allowing selection of a communication method desirable for the user, thereby reducing the burden of a communication operation.

Moreover, according to still another aspect of the present invention, an effect can be achieved that a communication connection process in the portable terminal device can be reduced and also a safe communication can be achieved.

Furthermore, according to still another aspect of the present invention, an effect can be achieved that can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
    a portable terminal device including a first communicating unit and a second communicating unit that have different communication ranges; and
    an information processing apparatus including a third communicating unit with a communication method same as a communication method of the first communicating unit and a fourth communicating unit with a communication method same as a communication method of the second communicating unit, wherein the portable terminal device and the information processing apparatus communicates with each other using the first communicating unit and the third communicating unit through a non-contact communication, and using the second communicating unit and the fourth communicating unit through a non-contact communication, when the portable terminal device is present in a communication area of the information processing apparatus, the first communicating unit transmits (a) communication setting information and (b) processing setting information for setting processing content on substance information containing a document or an image to be received or transmitted by the second communicating unit to the information processing apparatus through the non-contact communication, to establish a communication between the second communicating unit and the fourth communicating unit, and the second communicating unit establishes a communication with the information processing apparatus, and transmits to or receives from the information processing apparatus the substance information through the non-contact communication, wherein the portable terminal device further includes
an input receiving unit that receives an input of a transmission instruction of transmitting the processing setting information,
an attribute determining unit that determines an attribute of the substance information, and
a communication determining unit that determines, for a communication with the information processing apparatus, which of a communication by the first communicating unit or a communication by the second communicating unit is possible, and wherein in a case that the communication determining unit determines according to the attribute of the substance information determined by the attribute determining unit that a communication by the first communicating unit is possible, the first communicating unit transmits the substance information, and in a case that the communication determining unit determines according to the attribute of the substance information that a communication by the first communicating unit is not possible, the second communicating unit transmits the substance information, wherein when the communication determining unit determines that a communication by the first communicating unit is not possible, the second communicating unit transmits the processing setting information based on the input transmission instruction, and wherein when the portable terminal device is present in the communication area of the information processing apparatus, the third communicating unit receives the communication setting information and the processing setting information from the portable terminal device through the non-contact communication, and when the portable terminal device is not present in the communication area of the information processing apparatus, the fourth communicating unit receives from or transmits to the portable terminal device the communication setting information and the processing setting information through the non-contact communication, and wherein the information processing apparatus further includes a processing unit that processes the substance information with said processing content according to the processing setting information received by either one of the third communicating unit and the fourth communicating unit.

2. The information processing system according to claim 1, wherein the processing unit generates formation data based on the received processing setting information, and
the processing unit combines (i) the formation data and (ii) document data included in the received substance information to generate print data, and prints the print data.

3. The information processing system according to claim 1, wherein the attribute of the substance information is at least one of data size, number of pages, and degree of confidentiality of the substance information.

4. The information processing system according to claim 1, wherein the attribute of the substance information includes data size, the communication determining unit determines that a communication by the first communicating unit is possible in a case that the data size of the substance information is equal to or less than a predetermined reference value.

5. The information processing system according to claim 1, wherein the attribute of the substance information includes number of pages, the communication determining unit determines that a communication by the first communicating unit is possible in a case that the number of pages of the substance information is equal to or less than a predetermined reference value.

6. The information processing system according to claim 1, wherein the attribute of the substance information includes degree of confidentiality, the communication determining unit determines that a communication by the first communicating unit is possible in a case that the degree of confidentiality of the substance information is equal to or higher than a predetermined reference level.

7. The information processing system according to claim 1, wherein a maximum communication range of the first communicating unit is shorter than that of the second communicating unit, and a maximum data transfer rate of the first communicating unit is less than that of the second communicating unit.

8. An information processing apparatus that communicates with a portable terminal device through a non-contact communication, the information processing apparatus comprising a first communicating unit and a second communicating unit having different communication ranges,
wherein when the portable terminal device is present in a communication area of the information processing apparatus, the first communicating unit receives from or transmits to the portable terminal device (a) communication setting information and (b) processing setting information for setting processing content on substance information containing a document or an image to be received or transmitted through the non-contact communication, and
the second communicating unit establishes the communication with the portable terminal device through the non-contact communication, based on the communication setting information received by the first communicating unit,
wherein in a case that it is determined according to an attribute of the substance information that a communication by the first communicating unit is possible, the first communicating unit receives from or transmits to the portable terminal device the substance information, and in a case that it is determined according to the attribute of the substance information that a communication by the first communicating unit is not possible, the second communicating unit receives from or transmits to the portable terminal device the substance information, and the information processing apparatus further comprises a processing unit that processes the substance information with said processing content according to the processing setting information received by the first communicating unit.

9. The information processing apparatus according to claim 8, wherein the processing setting information is information related to printing, and based on the information related to printing, the processing unit prints the substance information.

10. The information processing apparatus according to claim 8, wherein the processing setting information is information related to scanning, the processing unit scans an original based on the information related to scanning to generate image data, and the second communicating unit transmits generated image data to the portable terminal device.

11. The information processing apparatus according to claim 8, wherein the first communicating unit receives from or transmits to the portable terminal device the substance information, in a case that a data size of the substance information is equal to or less than a predetermined reference value, and the second communicating unit receives from or transmits to the portable terminal device the substance information, in a case that the data size of the substance information is greater than the predetermined reference value.

12. The information processing apparatus according to claim 8, wherein the first communicating unit receives from or transmits to the portable terminal device the substance information, in a case that a number of pages of the substance information is equal to or less than a predetermined reference value, and the second communicating unit receives from or transmits to the portable terminal device the substance information, in a case that the number of pages of the substance information is greater than the predetermined reference value.

13. The information processing apparatus according to claim 8, wherein the first communicating unit receives from or transmits to the portable terminal device the substance information, in a case that a degree of confidentiality of the substance information is equal to or higher than a predetermined reference level, and the second communicating unit receives from or transmits to the portable terminal device the substance information, in a case that the degree of confidentiality of the substance information is lower than the predetermined reference level.

14. An information communication method for an information processing apparatus that communicates with a portable terminal device through a non-contact communication, the information processing apparatus including a first communicating unit and a second communicating unit having different communication ranges, the information communication method comprising:

first communicating by the first communicating unit, including, when the portable terminal device is present in a communication area of the information processing apparatus, receiving from or transmitting to the portable terminal device (a) communication setting information and (b) processing setting information for setting processing content on substance information containing a document or an image to be received or transmitted through the non-contact communication;

second communicating by the second communicating unit, including establishing the communication with the portable terminal device through the non-contact communication, based on the communication setting information;

receiving from or transmitting to the portable terminal device the substance information, by the first communicating unit, in a case that it is determined according to an attribute of the substance information that a communication by the first communicating unit is possible, and receiving from or transmitting to the portable terminal device the substance information, by the second communicating unit, in a case that it is determined according to the attribute of the substance information that a communication by the first communicating unit is not possible; and processing including a processing unit processing the substance information with said processing content according to the processing setting information.

15. The information communication method according to claim 14, wherein the processing setting information is information related to printing, and based on the information related to printing, the processing further includes the processing unit printing the substance information.

16. The information communication method according to claim 14, wherein the processing setting information is information related to scanning, the processing further includes the processing unit scanning an original based on the information related to scanning to generate image data, and the second communicating further includes the second communicating unit transmitting generated image data to the portable terminal device.

* * * * *